United States Patent
Yoo

(10) Patent No.: US 10,649,176 B2
(45) Date of Patent: May 12, 2020

(54) OPTICAL IMAGING SYSTEM

(71) Applicant: Samsung Electro-Mechanics Co., Ltd., Suwon-si (KR)

(72) Inventor: Ho Sik Yoo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 164 days.

(21) Appl. No.: 15/631,251

(22) Filed: Jun. 23, 2017

(65) Prior Publication Data

US 2018/0180847 A1   Jun. 28, 2018

(30) Foreign Application Priority Data

Dec. 28, 2016 (KR) .......................... 10-2016-0181546

(51) Int. Cl.
*G02B 13/00*   (2006.01)
*G02B 9/62*    (2006.01)
*G02B 27/00*   (2006.01)

(52) U.S. Cl.
CPC ............ *G02B 13/001* (2013.01); *G02B 9/62* (2013.01); *G02B 13/0045* (2013.01); *G02B 13/0065* (2013.01); *G02B 13/002* (2013.01); *G02B 27/0025* (2013.01)

(58) Field of Classification Search
None
See application file for complete search history.

(56) References Cited

U.S. PATENT DOCUMENTS

| 2007/0031134 A1* | 2/2007 | Kuroda | G02B 13/0035 396/55 |
| 2008/0247053 A1* | 10/2008 | Iwasawa | G02B 13/0065 359/676 |
| 2016/0044250 A1* | 2/2016 | Shabtay | H04N 5/247 348/240.3 |
| 2016/0178870 A1 | 6/2016 | Baik | |
| 2017/0108669 A1* | 4/2017 | Kim | G02B 15/177 |
| 2019/0056566 A1* | 2/2019 | Yoo | G02B 13/004 |

FOREIGN PATENT DOCUMENTS

| CN | 1908736 A | 2/2007 |
| CN | 101609208 A | 12/2009 |
| CN | 105717618 A | 6/2016 |
| JP | 2008-096621 A | 4/2008 |
| KR | 10-2016-0000759 A | 1/2016 |
| KR | 10-2016-0109473 A | 9/2016 |

OTHER PUBLICATIONS

Chinese Office Action dated Mar. 10, 2020 in corresponding Chinese Patent Application No. 201710828476.8 (10 pages in English, 7 pages in Chinese).

* cited by examiner

*Primary Examiner* — Derek S. Chapel
(74) *Attorney, Agent, or Firm* — NSIP Law

(57) ABSTRACT

An optical imaging system includes: a plurality of lenses disposed along an optical axis; and a reflection member closer to an object than the plurality of lenses, and including a reflection surface configured to change a path of light; wherein the plurality of lenses are spaced apart from each other by preset distances along the optical axis; and the condition $0.9<DF/DC<1.3$ is satisfied, where DF is an effective aperture radius of an image-side surface of a lens closest to an image sensor among the plurality of lenses, and DC is an effective aperture radius of an object-side surface of a lens closest to the reflection member among the plurality of lenses.

20 Claims, 25 Drawing Sheets

| SURFACE NO. | RADIUS OF CURVATURE | THICKNESS OR DISTANCE | REFRACTIVE INDEX | ABBE NUMBER | EFFECTIVE APERTURE RADIUS |
|---|---|---|---|---|---|
| 1 | 3.1450242 | 0.675 | 1.5441 | 56.11 | 1.680 |
| 2 | 11.930315 | 0.030 | | | 1.619 |
| 3 | 3.6 | 0.735 | 1.6504 | 21.52 | 1.564 |
| 4 | 2.2702668 | 0.709 | | | 1.334 |
| 5 | -4 | 0.230 | 1.6612 | 20.35 | 1.331 |
| 6 | -29.12949 | 0.235 | | | 1.308 |
| 7 | -4.197373 | 0.500 | 1.6142 | 25.60 | 1.380 |
| 8 | -2.626732 | 0.030 | | | 1.461 |
| 9 | 2.1119449 | 0.586 | 1.5441 | 56.11 | 1.722 |
| 10 | 2.6726648 | 0.610 | | | 1.700 |
| 11 | Infinity | 0.210 | 1.5167 | 64.17 | |
| 12 | Infinity | 5.9465 | | | |
| 13 | Infinity | | | | |

FIG. 4

| Surface | S1 | S2 | S3 | S4 | S5 | S6 | S7 | S8 | S9 | S10 |
|---|---|---|---|---|---|---|---|---|---|---|
| R | 3.145824211E+00 | 1.193031461E+01 | 3.600000000E+01 | 2.270266625E+00 | -4.000000000E+00 | -2.912949191E+01 | -4.197377264E+00 | -2.626732231E+00 | 2.111944911E+00 | 2.672864841E+00 |
| K | -5.364641331E-01 | 0 | 0 | 0 | 0 | 0 | 0 | 0 | 0 | 0 |
| A | 3.904301291E-03 | -5.084712511E-05 | -1.140941841E-02 | -1.796082321E-02 | -1.786320131E-02 | -4.780606771E-02 | -4.250953141E-02 | -3.306296081E-04 | -3.036020311E-02 | -2.535600291E-02 |
| B | -5.702568191E-04 | 1.117919381E-03 | 4.153770861E-03 | 7.100847971E-03 | 3.685063371E-03 | 3.532327781E-02 | -9.530303451E-03 | -2.754134981E-03 | 4.843369271E-03 | 9.552059661E-03 |
| C | 2.169179301E-04 | 5.997630181E-04 | -1.457480831E-03 | -1.893011441E-03 | -2.094546311E-02 | -1.025534681E-02 | 1.910031281E-02 | 2.897251681E-02 | -3.104873981E-03 | -4.153576841E-03 |
| D | -5.545021851E-05 | 7.698633661E-05 | 2.160234651E-05 | -1.045165091E-04 | 4.112176201E-04 | -1.734794961E-03 | -1.032879091E-02 | -1.164368211E-02 | 5.189506571E-04 | 6.491082901E-04 |
| E | | | | | | 1.045695941E-03 | 1.834883261E-03 | 1.442652691E-03 | -4.905777711E-04 | -2.243569791E-05 |

FIG. 5

| SURFACE NO. | RADIUS OF CURVATURE | THICKNESS OR DISTANCE | REFRACTIVE INDEX | ABBE NUMBER | EFFECTIVE APERTURE RADIUS |
|---|---|---|---|---|---|
| 1 | 3.3173561 | 0.803 | 1.5441 | 56.11 | 1.850 |
| 2 | 16.662105 | 0.030 | | | 1.778 |
| 3 | 4.2761402 | 0.850 | 1.6504 | 21.52 | 1.706 |
| 4 | 2.5 | 0.887 | | | 1.421 |
| 5 | -4.5 | 0.300 | 1.6612 | 20.35 | 1.404 |
| 6 | -14.03323 | 0.341 | | | 1.362 |
| 7 | -3.427518 | 0.500 | 1.6142 | 25.60 | 1.446 |
| 8 | -2.579409 | 0.030 | | | 1.561 |
| 9 | 2.7420177 | 0.700 | 1.5441 | 56.11 | 1.850 |
| 10 | 3.3032998 | 0.684 | | | 1.850 |
| 11 | Infinity | 0.110 | 1.5167 | 64.17 | |
| 12 | Infinity | 6.266 | | | |
| 13 | Infinity | | | | |

FIG. 9

| Surface | S1 | S2 | S3 | S4 | S5 | S6 | S7 | S8 | S9 | S10 |
|---|---|---|---|---|---|---|---|---|---|---|
| R | 3.317356807E+00 | 1.666210503E+00 | 4.276141015E+00 | 2.500000000E+00 | -4.500000000E+00 | -1.403322701E-01 | -3.427518355E+00 | -2.579409026E+00 | 2.742027735E+00 | 3.303249977E+00 |
| K | -6.578581100E-01 | 0 | 0 | 0 | 0 | 0 | 0 | 0 | 0 | 0 |
| A | 2.424370290E-03 | -1.517524100E-03 | -6.476341423E-03 | -8.309033386E-03 | 2.935387777E-03 | -1.541914321E-02 | -2.953795221E-02 | -2.650194836E-02 | -2.284693555E-02 | -2.828434190E-02 |
| B | -3.582133300E-04 | 1.183204271E-04 | 2.414556094E-03 | 2.455847988E-03 | 1.303812444E-02 | 1.683802211E-02 | 1.327845111E-04 | -7.507122231E-04 | 4.708376440E-03 | 8.965210170E-03 |
| C | 6.239998790E-05 | -3.065522180E-04 | -4.221909045E-04 | -3.827890010E-04 | -7.711957410E-04 | -6.058993320E-03 | 4.991448050E-03 | 1.117086603E-03 | -1.918617710E-03 | -3.031881440E-03 |
| D | -1.411303200E-05 | 2.250192920E-05 | 3.045731403E-05 | -1.563628550E-05 | 1.455217710E-04 | 3.890101630E-03 | -2.653839930E-03 | -4.312159201E-04 | 3.613570680E-04 | 5.472997120E-04 |
| E |  |  |  |  |  | 1.743447740E-04 | 4.027084060E-04 | 4.469997020E-05 | -2.339234270E-05 | -3.620224150E-05 |

FIG. 10

| SURFACE NO. | RADIUS OF CURVATURE | THICKNESS OR DISTANCE | REFRACTIVE INDEX | ABBE NUMBER | EFFECTIVE APERTURE RADIUS |
|---|---|---|---|---|---|
| 1 | 3.4283554 | 1.100 | 1.5441 | 56.11 | 1.900 |
| 2 | -350 | 0.030 | | | 1.791 |
| 3 | 3.8077955 | 0.740 | 1.6504 | 21.52 | 1.663 |
| 4 | 2.4 | 0.375 | | | 1.381 |
| 5 | 8.9497378 | 0.340 | 1.6392 | 23.52 | 1.368 |
| 6 | 4.3003475 | 1.100 | | | 1.259 |
| 7 | -2.4 | 0.710 | 1.6612 | 20.35 | 1.443 |
| 8 | -2.880789 | 0.100 | | | 1.708 |
| 9 | 3.5698787 | 0.700 | 1.5441 | 56.11 | 2.050 |
| 10 | 6.5362604 | 4.785 | | | 2.068 |
| 11 | Infinity | 0.110 | 1.5167 | 64.17 | |
| 12 | Infinity | 1.390 | | | |
| 13 | Infinity | | | | |

FIG. 14

| Surface | S1 | S2 | S3 | S4 | S5 | S6 | S7 | S8 | S9 | S10 |
|---|---|---|---|---|---|---|---|---|---|---|
| R | 3.428355342E+00 | -3.580000000E+01 | 3.807793542E+02 | 2.400000000E+01 | 8.949737384E+00 | 4.300347472E+01 | -2.400000000E+01 | -2.380783933E+01 | 3.569878700E+01 | 6.536260444E+00 |
| K | -6.186755573E-01 | 0 | 0 | 0 | 0 | 0 | 0 | -2.098274888E+00 | 0 | 0 |
| A | 2.311449943E-03 | 1.243009122E-03 | -8.232024570E-03 | -1.702613550E-03 | -2.161708900E-02 | 4.656795950E-03 | 3.417397730E-02 | -2.752436200E-03 | -2.777135800E-02 | -1.380096030E-02 |
| B | -1.786874700E-04 | -6.263173460E-04 | 1.566550030E-04 | 6.913887050E-03 | 1.009474310E-02 | 6.013332695E-03 | -1.709115520E-02 | -2.774457170E-03 | 7.180652990E-03 | 2.150131550E-03 |
| C | 9.683469880E-06 | 4.836194080E-05 | -4.533550690E-04 | -1.372507190E-03 | -4.092915910E-03 | -3.478410580E-03 | 8.159626930E-03 | 1.543400130E-03 | -1.236292940E-03 | -2.728848100E-05 |
| D | -8.971608080E-06 |  | 6.676606450E-05 | -8.003892460E-05 | 6.386665200E-04 | 3.808472840E-04 | -2.626130180E-03 | -4.418740330E-04 | 1.156703450E-04 | -3.904407850E-05 |
| E |  |  |  |  |  | 1.810222390E-04 | 3.921833950E-04 | 4.744547620E-05 | -3.485781990E-05 | 5.101396110E-06 |

FIG. 15

| SURFACE NO. | RADIUS OF CURVATURE | THICKNESS OR DISTANCE | REFRACTIVE INDEX | ABBE NUMBER | EFFECTIVE APERTURE RADIUS |
|---|---|---|---|---|---|
| 1 | 3.4742288 | 0.956 | 1.5441 | 56.11 | 1.900 |
| 2 | -26.02645 | 0.030 | | | 1.828 |
| 3 | 3.9665844 | 0.832 | 1.6504 | 21.52 | 1.681 |
| 4 | 2.4 | 0.343 | | | 1.354 |
| 5 | 5.4183114 | 0.342 | 1.6144 | 25.95 | 1.333 |
| 6 | 2.8189514 | 1.427 | | | 1.203 |
| 7 | -2.401117 | 0.688 | 1.6612 | 20.35 | 1.505 |
| 8 | -2.881942 | 0.030 | | | 1.777 |
| 9 | 7.6948459 | 0.819 | 1.5441 | 56.11 | 2.049 |
| 10 | -43.47497 | 4.785 | | | 2.134 |
| 11 | Infinity | 0.110 | 1.5167 | 64.17 | |
| 12 | Infinity | 1.118 | | | |
| 13 | Infinity | | | | |

FIG. 19

| Surface | S1 | S2 | S3 | S4 | S5 | S6 | S7 | S8 | S9 | S10 |
|---|---|---|---|---|---|---|---|---|---|---|
| R | 3.474228776E+01 | -2.602644480E+01 | 3.966584386E+00 | 2.480000000E+00 | 3.418311406E+00 | 2.818451406E+00 | -2.401116826E+00 | -2.881942316E+00 | 7.694840592E+00 | -4.347497336E+01 |
| K | -5.660232866E-01 | 0 | 0 | 0 | 0 | 0 | 0 | -2.156162986E+00 | 0 | 0 |
| A | 2.668086331E-03 | 4.726472266E-03 | -7.255965506E-03 | -1.803855376E-02 | 2.285982476E-02 | 7.821811576E-03 | 2.913242076E-03 | -2.632539516E-03 | -1.970458336E-02 | -1.037722396E-02 |
| B | -2.174324376E-04 | -1.470859036E-03 | 1.113646986E-03 | 7.808415666E-03 | 7.018294196E-03 | 3.142988966E-03 | -1.084844676E-02 | -1.734625926E-02 | 5.283124366E-03 | 1.279736196E-03 |
| C | 3.650704686E-05 | 2.213469866E-04 | -4.462356386E-04 | -1.457009016E-03 | -1.897045576E-03 | -1.505118416E-03 | 5.124364376E-03 | 1.043364786E-03 | -8.171144566E-04 | -9.494889016E-05 |
| D | -1.527752036E-05 | -2.417388816E-05 | 7.968875286E-05 | -3.288011056E-05 | 7.122845326E-05 | 3.091210546E-05 | 1.542467386E-05 | -2.841856636E-04 | 8.257026826E-05 | 1.228385776E-05 |
| E |  | 1.388011826E-06 |  |  |  | 1.082533096E-04 | 2.338578306E-04 | 2.624291666E-05 | -3.813231246E-06 | -6.980433286E-07 |

FIG. 20

| SURFACE NO. | RADIUS OF CURVATURE | THICKNESS OR DISTANCE | REFRACTIVE INDEX | ABBE NUMBER | EFFECTIVE APERTURE RADIUS |
|---|---|---|---|---|---|
| 1 | 4.0827965 | 0.969 | 1.5441 | 56.11 | 2.000 |
| 2 | -13.4612815 | 0.030 | | | 1.936 |
| 3 | 4.006729145 | 0.974 | 1.6612 | 20.35 | 1.807 |
| 4 | 2.005146558 | 0.775 | | | 1.469 |
| 5 | -460.179495 | 0.700 | 1.6392 | 23.52 | 1.423 |
| 6 | -5.37978369 | 0.030 | | | 1.305 |
| 7 | 17.38985778 | 0.320 | 1.6142 | 25.60 | 1.367 |
| 8 | 3.80918831 | 0.908 | | | 1.405 |
| 9 | -2.11695747 | 0.640 | 1.6504 | 21.52 | 1.484 |
| 10 | -2.66245901 | 0.030 | | | 1.769 |
| 11 | 11.2719851 | 0.623 | 1.5441 | 56.11 | 2.099 |
| 12 | -30.6784713 | 3.982 | | | 2.160 |
| 13 | Infinity | 0.210 | 1.5167 | 64.17 | |
| 14 | Infinity | 1.289 | | | |
| 15 | Infinity | | | | |

| Surface | S1 | S2 | S3 | S4 | S5 | S6 | S7 | S8 | S9 | S10 | S11 | S12 |
|---|---|---|---|---|---|---|---|---|---|---|---|---|
| R | 4.082786535E+00 | -1.346128215E+00 | 4.006729145E+00 | 2.005146565E+00 | -4.601794495E+01 | -5.379783695E+01 | 1.738395785E+01 | 3.809183315E+01 | -2.116957475E+01 | -2.662459015E+00 | 1.127196315E+01 | -3.067847135E+01 |
| K | -4.202087485E-01 | 0 | 0 | 0 | 0 | 0 | 0 | 0 | 0 | 0 | 0 | 0 |
| A | 3.845395295E-03 | 1.128658655E-02 | -2.212277105E-02 | -3.819714185E-02 | 1.731540205E-02 | 9.658875595E-03 | -1.872688035E-03 | -1.899913315E-04 | 3.809187995E-02 | -1.577287335E-03 | -1.234767995E-02 | -8.941337955E-03 |
| B | -2.162928795E-04 | -2.678349835E-03 | 7.189356575E-03 | 5.727825505E-04 | 1.502391635E-03 | -3.064291845E-03 | 1.819171195E-03 | 4.961338065E-04 | -8.575684255E-03 | -2.044012005E-03 | 4.027778625E-03 | 1.451141105E-03 |
| C | 1.863827875E-05 | 3.645740115E-04 | -5.036450685E-04 | -3.190092245E-03 | -5.676513205E-04 | 1.134595775E-03 | 7.677115315E-04 | -9.542494825E-04 | 3.849723495E-03 | 7.690021975E-04 | -6.470146025E-04 | -2.691757065E-04 |
| D | 1.008181525E-05 | -2.732346675E-05 | 1.542153655E-04 | 6.273710375E-04 | 1.324018305E-04 | -2.538895835E-04 | -1.676407925E-04 | 1.122371655E-05 | -9.494917365E-04 | -1.518880265E-04 | 5.629374085E-05 | 2.498066625E-05 |
| E | | 8.453486075E-07 | -1.171773185E-05 | -1.029895535E-04 | | 2.104774385E-05 | | | 1.325302655E-04 | 9.804014435E-06 | -1.785956805E-06 | -7.466441195E-07 |

OPTICAL IMAGING SYSTEM

CROSS-REFERENCE TO RELATED APPLICATIONS

This application claims the benefit under 35 USC 119(a) of Korean Patent Application No. 10-2016-0181546 filed on Dec. 28, 2016, in the Korean Intellectual Property Office, the entire disclosure of which is incorporated herein by reference for all purposes.

BACKGROUND

1. Field

This application relates to an optical imaging system.

2. Description of Related Art

Recently, mobile communications terminals have been provided with cameras, enabling video calling and image capturing. In addition, as levels of functionality of cameras in such mobile communications terminals have gradually increased, cameras for use in mobile communications terminals have gradually been required to have higher levels of resolution and performance.

However, since there is a trend for mobile communications terminals to be miniaturized and lightened, there are limitations in implementing camera modules having high levels of resolution and performance.

Telephoto lenses, particularly, have a relatively long focal length and overall length, and it is thus difficult to mount the telephoto lenses in the mobile communications terminals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a plurality of lenses disposed along an optical axis; and a reflection member disposed closer to an object than the plurality of lenses, and including a reflection surface configured to change a path of light; wherein the plurality of lenses are spaced apart from each other by preset distances along the optical axis; and the condition $0.9<DF/DC<1.3$ is satisfied, where DF is an effective aperture radius of an image-side surface of a lens closest to an image sensor among the plurality of lenses, and DC is an effective aperture radius of an object-side surface of a lens closest to the reflection member among the plurality of lenses.

The condition $FOV \leq 40$ may be satisfied, where FOV is a field of view of an optical system including the plurality of lenses.

The condition $1.3<TTL/BFL<3.5$ may be satisfied, where TTL is a distance from the object-side surface of the lens closest to the reflection member to an imaging plane of the image sensor, and BFL is a distance from the image-side surface of the lens closest to the image sensor to the imaging plane of the image sensor.

The condition $0.8<TTL/f<1.5$ may be satisfied, where TTL is a distance from the object-side surface of the lens closest to the reflection member to an imaging plane of the image sensor, and f is an overall focal length of an optical system including the plurality of lenses.

The plurality of lenses may include a first lens, a second lens, a third lens, a fourth lens, and a fifth lens sequentially disposed in numerical order beginning with the first lens from an object side of an optical system including the plurality of lenses toward an image side of the optical system; and the condition $0.6<f12/f<2.0$ may be satisfied, where f12 is a combined focal length of the first lens and the second lens, and f is an overall focal length of an optical system including the first, second, third, fourth, and fifth lenses.

The plurality of lenses may include a first lens having a positive refractive power, an object-side surface thereof being convex and an image-side surface thereof being concave; a second lens having a negative refractive power; a third lens having a negative refractive power, an image-side surface thereof being convex; a fourth lens, an object-side surface thereof being concave; and a fifth lens, an object-side surface thereof being convex; and the first, second, third, fourth, and fifth lenses are sequentially disposed in numerical order beginning with the first lens from an object side of an optical system including the first, second, third, fourth, and fifth lenses to an image side of the optical system.

The plurality of lenses may include a first lens having a positive refractive power; a second lens having a negative refractive power; a third lens having a negative refractive power; a fourth lens having a positive refractive power; and a fifth lens having a positive refractive power; and the first, second, third, fourth, and fifth lenses may be sequentially disposed in numerical order beginning with the first lens from an object side of an optical system including the first, second, third, fourth, and fifth lenses toward an image side of the optical system.

The plurality of lenses may include a first lens having a positive refractive power, an object-side surface and an image-side surface thereof being convex; a second lens having a negative refractive power, an object-side surface thereof being convex and an image-side surface thereof being concave; a third lens having a negative refractive power; a fourth lens having a negative refractive power; and a fifth lens; and the first, second, third, fourth, and fifth lenses may be sequentially disposed in numerical order beginning with the first lens from an object side of an optical system including the first, second, third, fourth, and fifth lenses toward an image side of the optical system.

An object-side surface and an image-side surface of the fifth lens may be convex.

The plurality of lenses may include a first lens, a second lens, a third lens, a fourth lens, a fifth lens, and a sixth lens sequentially disposed in numerical order beginning with the first lens from an object side of an optical system including the first, second, third, fourth, fifth, and sixth lenses toward an image side of the optical system; and the condition $0.6<f12/f<2.0$ may be satisfied, where f12 is a combined focal length of the first lens and the second lens, and f is an overall focal length of an optical system including the first, second, third, fourth, fifth, and sixth lenses.

The plurality of lenses may include a first lens having a positive refractive power, an object-side surface and an image-side surface thereof being convex; a second lens having a negative refractive power, an object-side surface thereof being convex; a third lens, an object-side surface thereof being concave; a fourth lens, an object-side surface thereof being convex; a fifth lens; and a sixth lens, an object-side surface and an image-side surface thereof being convex; and the first, second, third, fourth, fifth, and sixth lenses may be sequentially disposed in numerical order beginning with the first lens from an object side of an optical system including the first, second, third, fourth, fifth, and sixth lenses toward an image side of the optical system.

The plurality of lenses may include a first lens having a positive refractive power, an object-side surface and an image-side surface thereof being convex; a second lens having a negative refractive power, an object-side surface thereof being convex; a third lens, an object-side surface thereof being concave; a fourth lens; a fifth lens, an object-side surface thereof being concave; and a sixth lens, an object-side surface and an image-side surface thereof being convex; and the first, second, third, fourth, fifth, and sixth lenses may be sequentially disposed in numerical order beginning with the first lens from an object side of an optical system including the first, second, third, fourth, fifth, and sixth lenses toward an image side of the optical system.

The lens closest to the reflection member and the lens closest to the image sensor may be plastic lenses made of a first plastic material; and remaining lenses of the plurality of lenses may be plastic lenses respectively made of other plastic materials having respective optical characteristics that are different from optical characteristics of the first plastic material, and different from one another, such that each one of the remaining lenses is made of a plastic material having optical characteristics that are different from the optical characteristics of the first plastic material, and different from the respective optical characteristics of the respective plastic materials of which all other ones of the remaining lenses are made.

In another general aspect, an optical imaging system includes a plurality of lenses disposed along an optical axis; and a reflection member disposed closer to an object than all the plurality of lenses, and including a reflection surface configured to change a path of light; wherein the plurality of lenses are spaced apart from each other by preset distances along the optical axis; an object-side surface and an image-side surface of each of the plurality of lenses are aspherical; and the condition $0.9<DF/DC<1.3$ is satisfied, where DF is an effective aperture radius of an image-side surface of a lens closest to an image sensor among the plurality of lenses, and DC is an effective aperture radius of an object-side surface of a lens closest to the reflection member among the plurality of lenses.

The plurality of lenses may include a first lens having a positive refractive power, an object-side surface thereof being convex and an image-side surface thereof being concave; a second lens having a negative refractive power; a third lens having a negative refractive power, an image-side surface thereof being convex; a fourth lens, an object-side surface thereof being concave; and a fifth lens, an object-side surface thereof being convex; and the first, second, third, fourth, and fifth lenses may be sequentially disposed in numerical order beginning with the first lens from an object side of an optical system including the first, second, third, fourth, and fifth lenses toward an image side of the optical system.

The plurality of lenses may include a first lens having a positive refractive power, an object-side surface and an image-side surface thereof being convex; a second lens having a negative refractive power, an object-side surface thereof being convex; a third lens, an object-side surface thereof being concave; a fourth lens, an object-side surface thereof being convex; a fifth lens; and a sixth lens, an object-side surface and an image-side surface thereof being convex; and the first, second, third, fourth, fifth, and sixth lenses may be sequentially disposed in numerical order beginning with the first lens from an object side of an optical system including the first, second, third, fourth, fifth, and sixth lenses toward an image side of the optical system.

In another general aspect, a optical imaging system includes a reflection surface configured to reflect light from an object; and an optical system configured to receive the light from the object reflected by the reflection surface and focus an image of the object onto an imaging plane of an image sensor; wherein the optical system includes a plurality of lenses disposed along an optical axis; and the conditions $1.3<TTL/BFL<3.5$ and $0.8<TTL/f<1.5$ are satisfied, where TTL is a distance from an object-side surface of a lens closest to the reflection surface among the plurality of lenses to the imaging plane of the image sensor, BFL is a distance from an image-side surface of a lens closest to the imaging plane of the image sensor among the plurality of lenses to the imaging plane of the image sensor, and f is an overall focal length of the optical system.

The condition $0.9<DF/DC<1.3$ may be satisfied, where DF is an effective aperture radius of the image-side surface of the lens closest to the imaging plane of the image sensor, and DC is an effective aperture radius of the object-side surface of the lens closest to the reflection surface.

The lens closest to the reflection surface may be a first lens of the optical system; a lens closest to the first lens among the plurality of lenses may be a second lens of the optical system; and the condition $0.6<f12/f<2.0$ may be satisfied, where f12 is a combined focal length of the first lens and the second lens.

The plurality of lenses may include a first lens having a positive refractive power, the first lens being the lens closest to the reflection surface; a second lens having a negative refractive power; a third lens having a negative refractive power; a fourth lens having a positive refractive power or a negative refractive power; and a fifth lens having a positive refractive power, the fifth lens being the lens closest to the imaging plane of the image sensor; and the first, second, third, fourth, and fifth lenses may be sequentially disposed in numerical order from the first lens to the fifth lens.

The plurality of lenses may include a first lens having a positive refractive power, the first lens being the lens closest to the reflection surface; a second lens having a negative refractive power; a third lens having a positive refractive power; a fourth lens having a negative refractive power; a fifth lens having a negative refractive power; and a sixth lens having a positive refractive power, the sixth lens being the lens closest to the imaging plane of the image sensor; and the first, second, third, fourth, fifth, and sixth lenses may be sequentially disposed in numerical order from the first lens to the sixth lens.

Other features and aspects will be apparent from the following detailed description, the drawings, and the claims.

BRIEF DESCRIPTION OF DRAWINGS

FIG. 4 is a table listing characteristics of lenses of the optical imaging system illustrated in FIG. 1.

FIG. 5 is a table listing aspherical coefficients of lenses of the optical imaging system illustrated in FIG. 1.

FIG. 9 is a table listing characteristics of lenses of the optical imaging system illustrated in FIG. 6.

FIG. 10 is a table listing aspherical coefficients of lenses of the optical imaging system illustrated in FIG. 6.

FIG. 14 is a table listing characteristics of lenses of the optical imaging system illustrated in FIG. 11.

FIG. 15 is a table listing aspherical coefficients of lenses of the optical imaging system illustrated in FIG. 11.

FIG. 19 is a table listing characteristics of lenses of the optical imaging system illustrated in FIG. 16.

FIG. 20 is a table listing aspherical coefficients of lenses of the optical imaging system illustrated in FIG. 16.

FIG. 24 is a table listing characteristics of lenses of the optical imaging system illustrated in FIG. 21.

FIG. 25 is a table listing aspherical coefficients of lenses of the optical imaging system illustrated in FIG. 21.

DETAILED DESCRIPTION

Figure 1:
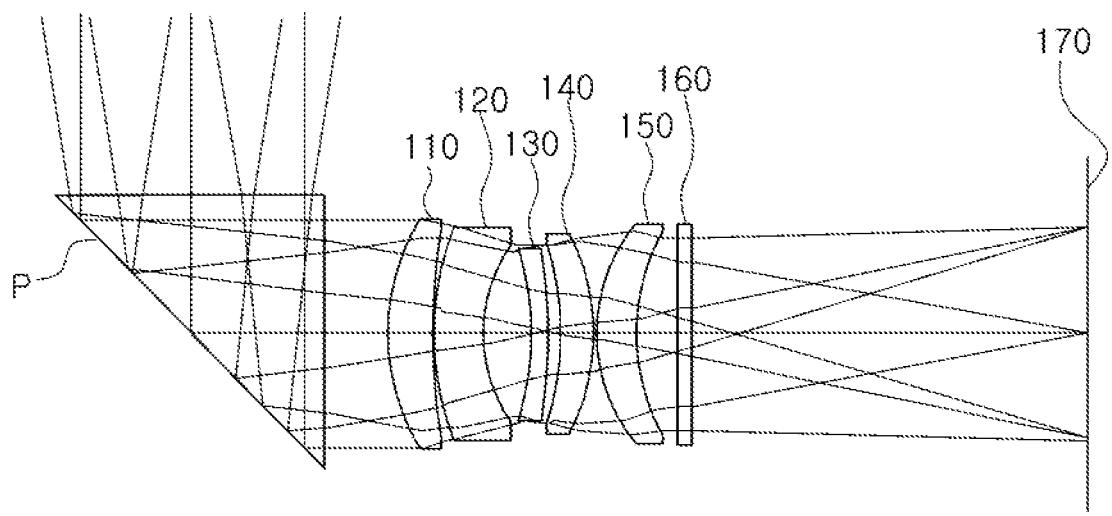
FIG. 1 is a view illustrating an example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In the drawings, the thicknesses, sizes, and shapes of lenses have been slightly exaggerated for convenience of explanation. In particular, the shapes of spherical surfaces or aspherical surfaces illustrated in the drawings are illustrated by way of example. That is, the shapes of the spherical surfaces or the aspherical surfaces are not limited to the specific shapes illustrated in the drawings.

An optical imaging system in the examples described herein includes a plurality of lenses disposed along an optical axis. The plurality of lenses are spaced apart from each other by preset distances along the optical axis.

In the examples described herein, the optical imaging system includes five or six lenses.

In examples described herein in which the optical imaging system includes five lenses, a first lens is a lens closest to an object, while a fifth lens is a lens closest to an image sensor.

In examples described herein in which the optical imaging system includes six lenses, a first lens is a lens closest to an object, while a sixth lens is a lens closest to an image sensor.

In addition, a first surface of each lens is a surface thereof closest to an object (i.e., an object-side surface of the lens), and a second surface of each lens is a surface thereof closest to an image (i.e., an image-side surface of the lens). Further, all numerical values of radii of curvature, thicknesses of lenses, other parameters are expressed in millimeters (mm), and angles are expressed in degrees.

Further, a statement that a surface of a lens is convex means that a paraxial region of that surface is convex, and a statement that a surface of a lens is concave means that that a paraxial region of that surface is concave. Therefore, although a surface of a lens may be described as being convex, an edge portion of that surface may be concave. Likewise, although a surface of a lens may be described as being concave, an edge portion of that surface may be convex.

A paraxial region of a surface is a very narrow region in the vicinity of an optical axis of that surface.

In some examples disclosed herein, an optical imaging system includes five lenses.

For example, the optical imaging system in such examples includes a first lens, a second lens, a third lens, a fourth lens, and a fifth lens sequentially disposed in numerical order beginning with the first lens from an object side of an optical system including the first to fifth lenses toward an image side of the optical system.

In other examples disclosed herein, an optical imaging system includes six lenses.

For example, the optical imaging system in such examples includes a first lens, a second lens, a third lens, a fourth lens, a fifth lens, and a sixth lens sequentially disposed in numerical order beginning with the first lens from an object side of an optical system including the first to fifth lenses toward an image side of the optical system.

However, the optical imaging system in the examples disclosed herein is not limited to only five or six lenses, but further includes other components.

For example, the optical imaging system further includes a reflection member having a reflection surface that changes a path of light. For example, the reflection member changes the path of the light by 90°. As an example, the reflection member may be a mirror or a prism.

The reflection member is disposed closer to an object than a plurality of lenses. Therefore, a lens closest to the object is a lens closest to the reflection member.

Also, the optical imaging system further includes an image sensor that converts an image of a subject incident on the image sensor into an electrical signal.

In addition, the optical imaging system includes an infrared cut-off filter that blocks infrared light. The infrared cut-off filter is between a lens (the fifth lens or the sixth lens) closest to the image sensor and the image sensor.

In the optical imaging system in the examples described herein, all of the lenses are plastic lenses.

A lens closest to the reflection member and a lens closest to the image sensor among the plurality of lenses of the optical imaging system are plastic lenses made of a first plastic material, and remaining lenses of the plurality of lenses are plastic lenses respectively made of other plastic materials having respective optical characteristics that are different from optical characteristics of the first plastic material, and different from one another. That is, each one of the remaining lenses is made of a plastic material having optical characteristics that are different from the optical characteristics of the first plastic material, and different from the respective optical characteristics of the respective plastic materials of which all other ones of the remaining lenses are made.

In one example, in the optical imaging system including the five lenses, the first lens and the fifth lens are made of a first plastic material, the second lens is made of a second plastic material having optical characteristics different from optical characteristics of the first plastic material, the third lens is made of a third plastic material having optical characteristics different from the optical characteristics of the first plastic material and the optical characteristics of the second plastic material, and the fourth lens is made of a fourth plastic material having optical characteristics different from the optical characteristics of the first plastic material, the optical characteristics of the second plastic material, and the optical characteristics of the third plastic material.

In another example, in the optical imaging system including the six lenses, the first lens and the sixth lens are made of a first plastic material, the second lens is made of a second plastic material having optical characteristics different from optical characteristics of the first plastic material, the third lens is made of a third plastic material having optical characteristics different from the optical characteristics of the first plastic material and the optical characteristics of the second plastic material, the fourth lens is made of a fourth plastic material having optical characteristics different from the optical characteristics of the first plastic material, the optical characteristics of the second plastic material, and the optical characteristics of the third plastic material, and the fifth lens is made of a fifth plastic material having optical characteristics different from the optical characteristics of the first plastic material, the optical characteristics of the second plastic material, the optical characteristics of the third plastic material, and the optical characteristics of the fourth plastic material.

In addition, the plurality of lenses each have at least one aspherical surface.

That is, at least one of first and second surfaces of all of the first to sixth lenses is aspherical. The aspherical surfaces of the first to sixth lenses are represented by the following Equation 1:

$$Z = \frac{cY^2}{1+\sqrt{1-(1+K)c^2Y^2}} + AY^4 + BY^6 + CY^8 + DY^{10} + EY^{12} + FY^{14} + \ldots \quad (1)$$

In Equation 1, c is a curvature (an inverse of a radius of curvature) of a lens, K is a conic constant, and Y is a distance from a certain point on an aspherical surface of the lens to an optical axis of the lens in a direction perpendicular to the optical axis. In addition, constants A to F are aspherical coefficients. In addition, Z is a distance between the certain point on the aspherical surface of the lens at the distance Y and a tangential plane meeting the apex of the aspherical surface of the lens. The ellipsis . . . in Equation 1 indicates that additional terms $GY^{16}$, $HY^8$, $JY^{20}$, and so on may be added to further refine the shape of the aspherical surface.

In one example, the optical imaging system including the first to fifth lenses has a positive refractive power/a negative refractive power/a negative refractive power/a positive refractive power/a positive refractive power sequentially in the order listed beginning from the object side of the optical imaging system.

In another example, the optical imaging system including the first to fifth lenses has a positive refractive power/a negative refractive power/a negative refractive power/a negative refractive power/a positive refractive power sequentially in the order listed beginning from the object side of the optical imaging system.

In another example, the optical imaging system including the first to sixth lenses has a positive refractive power/a negative refractive power/a positive refractive power/a negative refractive power/a negative refractive power/a positive refractive power sequentially in the order listed beginning from the object side of the optical imaging system.

The optical imaging system of the examples described herein satisfies the following Conditional Expressions 2 through 7:

$$FOV \leq 40 \quad (2)$$

$$0.9 < DF/DC < 1.3 \quad (3)$$

$$1.3 < TTL/BFL < 3.5 \quad (4)$$

$$0.8 < TTL/f < 1.5 \quad (5)$$

$$0.6 < f12/f < 2.0 \quad (6)$$

$$CRA\_max < 25 \quad (7)$$

In the above Conditional Expressions 2 through 7, FOV is a field of view of the optical imaging system, DF is an effective aperture radius of an image-side surface of a lens closest to the image sensor, DC is an effective aperture radius of an object-side surface of a lens closest to the object (or the reflection member), TTL is a distance from an object-side surface of the first lens to an imaging plane of the image sensor, BFL is a distance from the image-side surface of the lens closest to the image sensor to the imaging plane of the image sensor, f is an overall focal length of the optical imaging system, f12 is a combined focal length of the first lens and the second lens, and CRA_max is a maximum value of an incident angle of a chief ray, also known as a principal ray, incident on the imaging plane. The effective aperture radius of a lens surface is the radius of the portion of the lens surface through which light rays actually pass. CRA denotes "chief ray angle." The incident angle of the chief ray, i.e., the chief ray angle or CRA, is measured relative to the optical axis.

Next, the first to fifth lenses constituting the optical imaging system in some examples will be described.

The first lens has a positive refractive power. In addition, the first lens has a meniscus shape, of which an object-side surface is convex. In detail, a first surface of the first lens is convex in the paraxial region, and a second surface thereof is concave in the paraxial region. Alternatively, both surfaces of the first lens are convex. In further detail, the first and second surfaces of the first lens are convex.

At least one of the first and second surfaces of the first lens is aspherical. For example, both surfaces of the first lens are aspherical.

The second lens has a negative refractive power. In addition, the second lens has a meniscus shape, of which an object-side surface is convex. In detail, a first surface of the second lens is convex in the paraxial region, and a second surface thereof is concave in the paraxial region.

At least one of the first and second surfaces of the second lens is aspherical. For example, both surfaces of the second lens are aspherical.

The third lens has a negative refractive power. In addition, the third lens has a meniscus shape, of which an image-side surface is convex. In detail, a first surface of the third lens is concave in the paraxial region, and a second surface thereof is convex in the paraxial region. Alternatively, the third lens has a meniscus shape, of which an object-side surface is convex. In detail, a first surface of the third lens is convex in the paraxial region, and a second surface thereof is concave in the paraxial region.

At least one of the first and second surfaces of the third lens is aspherical. For example, both surfaces of the third lens are aspherical.

The fourth lens has a positive or negative refractive power. In addition, the fourth lens has a meniscus shape, of which an image-side surface is convex. In detail, a first surface of the fourth lens is concave in the paraxial region, and a second surface thereof is convex in the paraxial region.

At least one of the first and second surfaces of the fourth lens is aspherical. For example, both surfaces of the fourth lens are aspherical.

The fifth lens may has a positive refractive power. In addition, the fifth lens has a meniscus shape, of which an object-side surface is convex. In detail, a first surface of the fifth lens is convex in the paraxial region, and a second surface thereof is concave in the paraxial region. Alternatively, both surfaces of the fifth lens are convex. In detail, the first and second surfaces of the fifth lens are convex.

At least one of the first and second surfaces of the fifth lens is aspherical. For example, both surfaces of the fifth lens are aspherical.

Next, the first to sixth lenses constituting the optical imaging system in other examples will be described.

The first lens has a positive refractive power. In addition, both surfaces of the first lens are convex. In detail, first and second surfaces of the first lens are convex in the paraxial region.

At least one of the first and second surfaces of the first lens is aspherical. For example, both surfaces of the first lens are aspherical.

The second lens has a negative refractive power. In addition, the second lens has a meniscus shape, of which an object-side surface is convex. In detail, a first surface of the second lens is convex in the paraxial region, and a second surface thereof is concave in the paraxial region.

At least one of the first and second surfaces of the second lens is aspherical. For example, both surfaces of the first lens are aspherical.

The third lens has a positive refractive power. In addition, the third lens has a meniscus shape, of which an image-side surface is convex. In detail, a first surface of the third lens is concave in the paraxial region, and a second surface thereof is convex in the paraxial region.

At least one of the first and second surfaces of the third lens is aspherical. For example, both surfaces of the first lens are aspherical.

The fourth lens has a negative refractive power. In addition, the fourth lens has a meniscus shape, of which an object-side surface is convex. In detail, a first surface of the fourth lens is convex in the paraxial region, and a second surface thereof is concave in the paraxial region.

At least one of the first and second surfaces of the fourth lens is aspherical. For example, both surfaces of the first lens are aspherical.

The fifth lens has a negative refractive power. In addition, the fifth lens has a meniscus shape, of which an image-side surface is convex. In detail, a first surface of the fifth lens is concave in the paraxial region, and a second surface thereof is convex in the paraxial region.

At least one of the first and second surfaces of the fifth lens is aspherical. For example, both surfaces of the first lens are aspherical.

The sixth lens has a positive refractive power. In addition, both surfaces of the sixth lens are convex. In detail, first and second surfaces of the sixth lens are convex in the paraxial region.

At least one of the first and second surfaces of the sixth lens is aspherical. For example, both surfaces of the first lens are aspherical.

In examples of the optical imaging system configured as described above, a plurality of lenses perform an aberration correction function to thus increase an aberration improvement performance.

In addition, in examples of the optical imaging system described herein, a constant (Fno) indicating a brightness of the optical imaging system is 2.4 or less. Therefore, the optical imaging system clearly captures an image even in an environment in which illumination is low.

In addition, the optical imaging system in the examples described herein has a telescopic ratio (TTL/f) of less than 1, thereby being a telescopic lens, and has a field of view (FOV) of 40° or less, thereby having a narrow FOV.

An example of an optical imaging system will now be described with reference to FIGS. 1 through 5.

Figure 2:
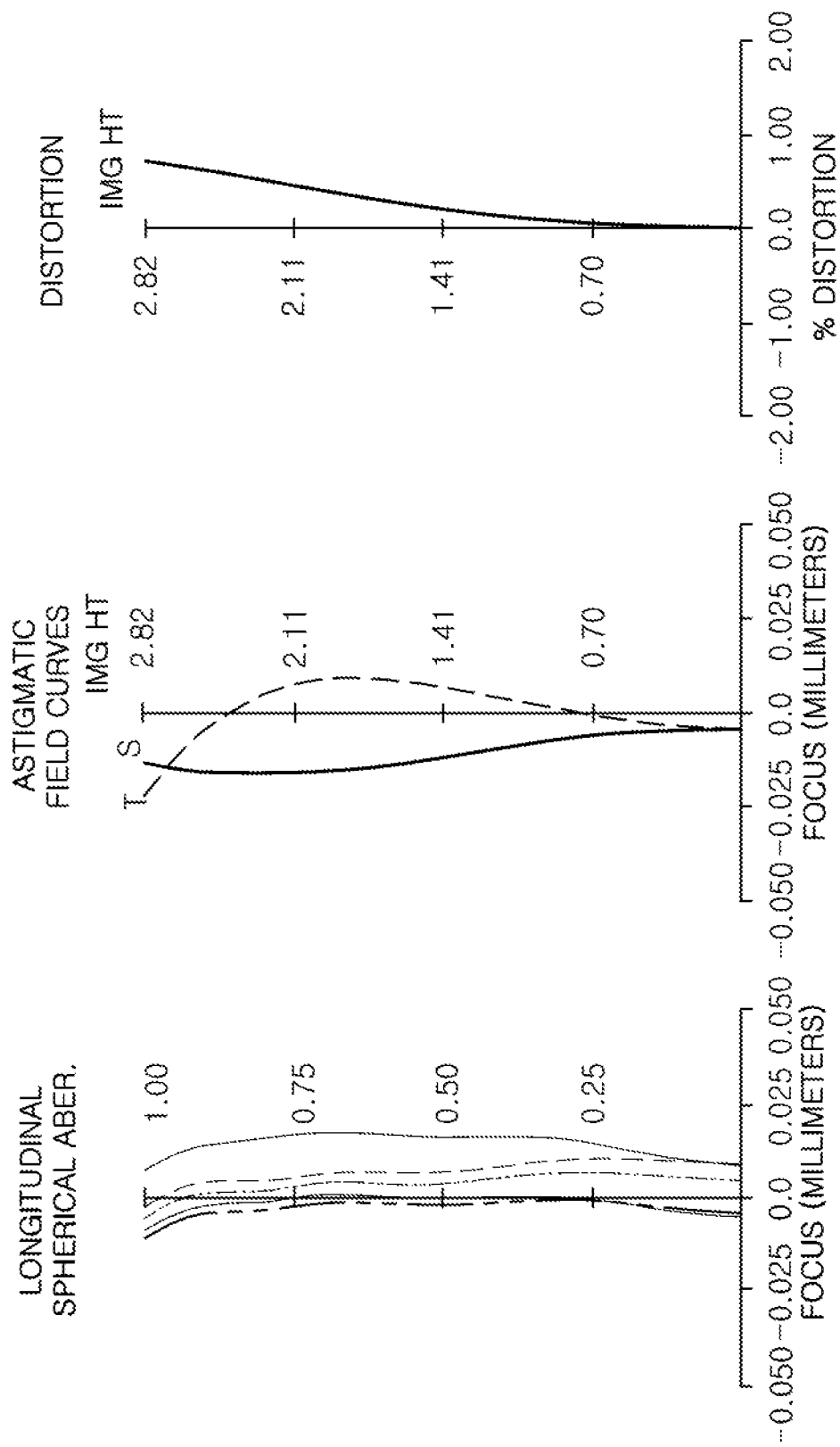
FIGS. 2 and 3 are graphs showing curves illustrating aberration characteristics of the optical imaging system illustrated in FIG. 1.
Figure 3:
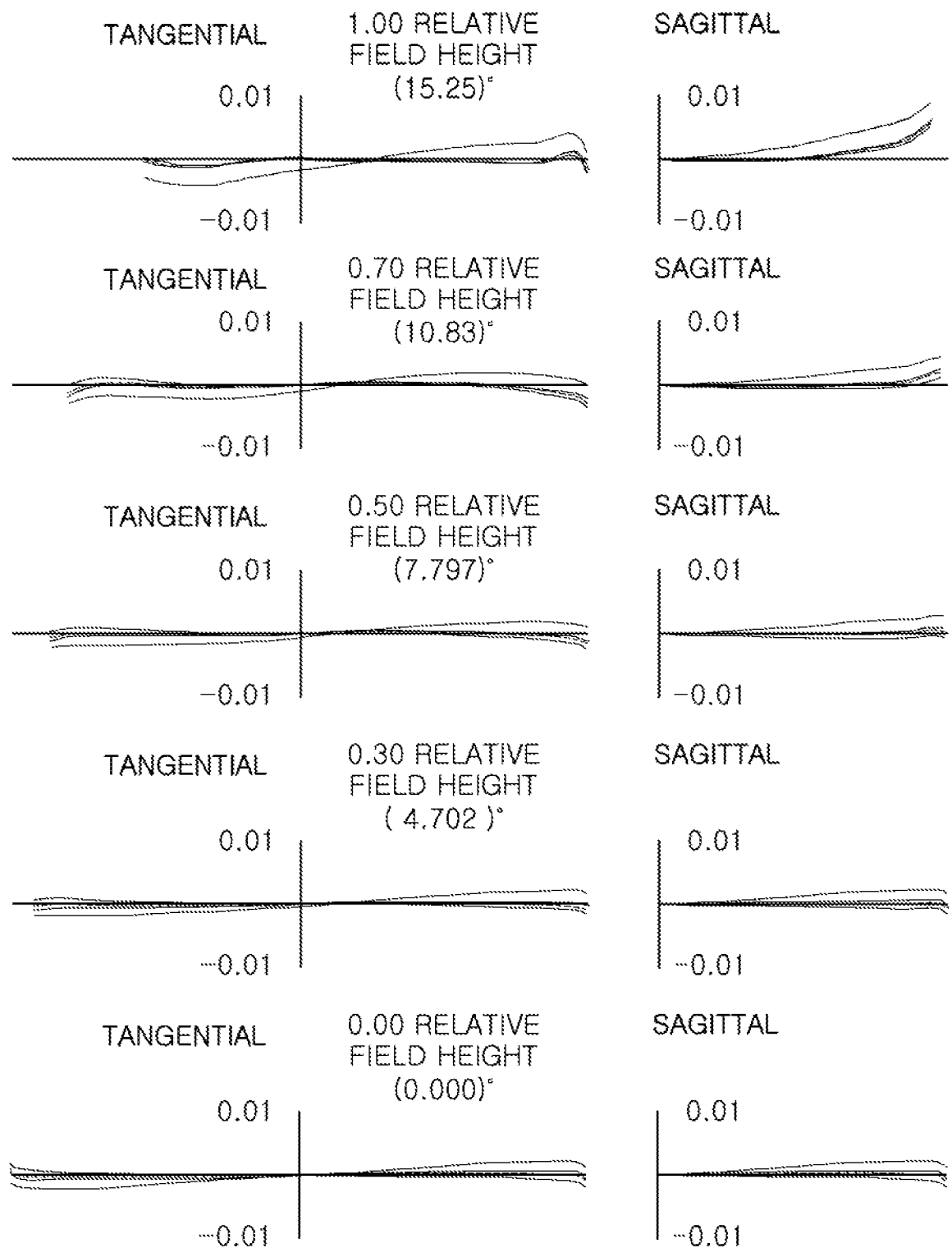

FIG. 1 is a view illustrating an example of an optical imaging system. FIGS. 2 and 3 are graphs showing curves illustrating aberration characteristics of the optical imaging system illustrated in FIG. 1. FIG. 4 is a table listing characteristics of lenses of the optical imaging system illustrated in FIG. 1. FIG. 5 is a table listing aspherical coefficients of lenses of the optical imaging system illustrated in FIG. 1.

Referring to FIG. 1, the optical imaging system includes an optical system including a first lens 110, a second lens 120, a third lens 130, a fourth lens 140, and a fifth lens 150. The optical imaging system further includes an infrared cut-off filter 160 and an image sensor 170.

In addition, the optical imaging system includes a reflection member P disposed closer to an object than the first lens 110, and having a reflection surface that changes a path of light.

Characteristics (radii of curvature, thicknesses or distances between lenses, refractive indices, and Abbe numbers) of the first to fifth lenses 110 to 150 are illustrated in FIG. 4.

An overall focal length (f) of the optical imaging system is 9.5477 mm, a focal length (f1) of the first lens 110 is 7.642474 mm, a focal length (f2) of the second lens 120 is −12.08204 mm, a focal length (f3) of the third lens 130 is −7.038196 mm, a focal length (f4) of the fourth lens 140 is 10.19416 mm, and a focal length (f5) of the fifth lens 150 is −13.520396 mm.

A field of view (FOV) of the optical imaging system is 30.5°, a distance (TTL) from an object-side surface of the first lens 110 to an imaging plane of the image sensor 170 is 10.498 mm, a distance (BFL) from the image-side surface of the fifth lens 150 closest to the image sensor 170 to the imaging plane of the image sensor 170 is 6.767 mm, a combined focal length (f12) of the first lens 110 and the second lens 120 is 14.01355 mm, and a maximum value (CRA_max) of an incident angle of a chief ray incident on the imaging plane is 19.013°. The distance TTL is equal to the sum of the thicknesses or distances for surfaces 1 to 12 in FIG. 4, and the distance BFL is equal to the sum of the thicknesses or distances for surfaces 10 to 12 in FIG. 4. However, although the values of thickness or distance in FIG. 4 are shown to 3 or 4 decimal places, the actual values have more decimal places, and thus the actual values of TTL=10.498 mm and BFL=6.767 mm are slightly different from the sums TTL=10.4965 mm and BFL=6.7665 mm obtained from the values of thickness or distance in FIG. 4 due to the unillustrated additional decimal places.

The first lens 110 has a positive refractive power, a first surface thereof is convex in the paraxial region, and a second surface thereof is concave in the paraxial region.

The second lens 120 has a negative refractive power, a first surface thereof is convex in the paraxial region, and a second surface thereof is concave in the paraxial region.

The third lens 130 has a negative refractive power, a first surface thereof is concave in the paraxial region, and a second surface thereof is convex in the paraxial region.

The fourth lens 140 has a positive refractive power, a first surface thereof is concave in the paraxial region, and a second surface thereof is convex in the paraxial region.

The fifth lens 150 has a positive refractive power, a first surface thereof is convex in the paraxial region, and a second surface thereof is concave in the paraxial region.

Surfaces of the first to fifth lenses 110 to 150 have aspherical coefficients as illustrated in FIG. 5. In this example, all object-side surfaces and all image-side surfaces of the first to fifth lenses 110 to 150 are aspherical.

The optical imaging system illustrated in FIG. 1 has the aberration characteristics illustrated in FIGS. 2 and 3.

Another example of an optical imaging system will now be described with reference to FIGS. 6 through 10.

Figure 6:
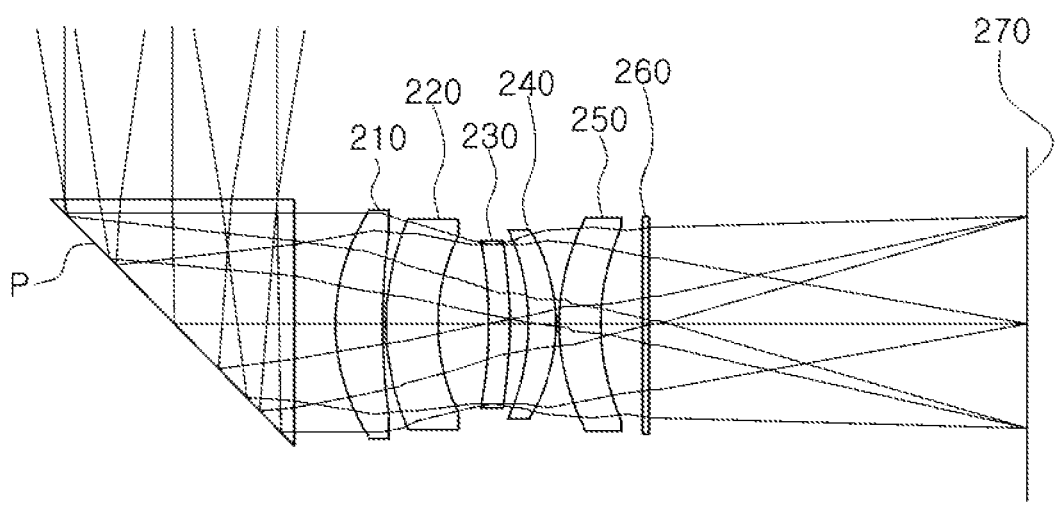
FIG. 6 is a view illustrating another example of an optical imaging system.
Figure 7:
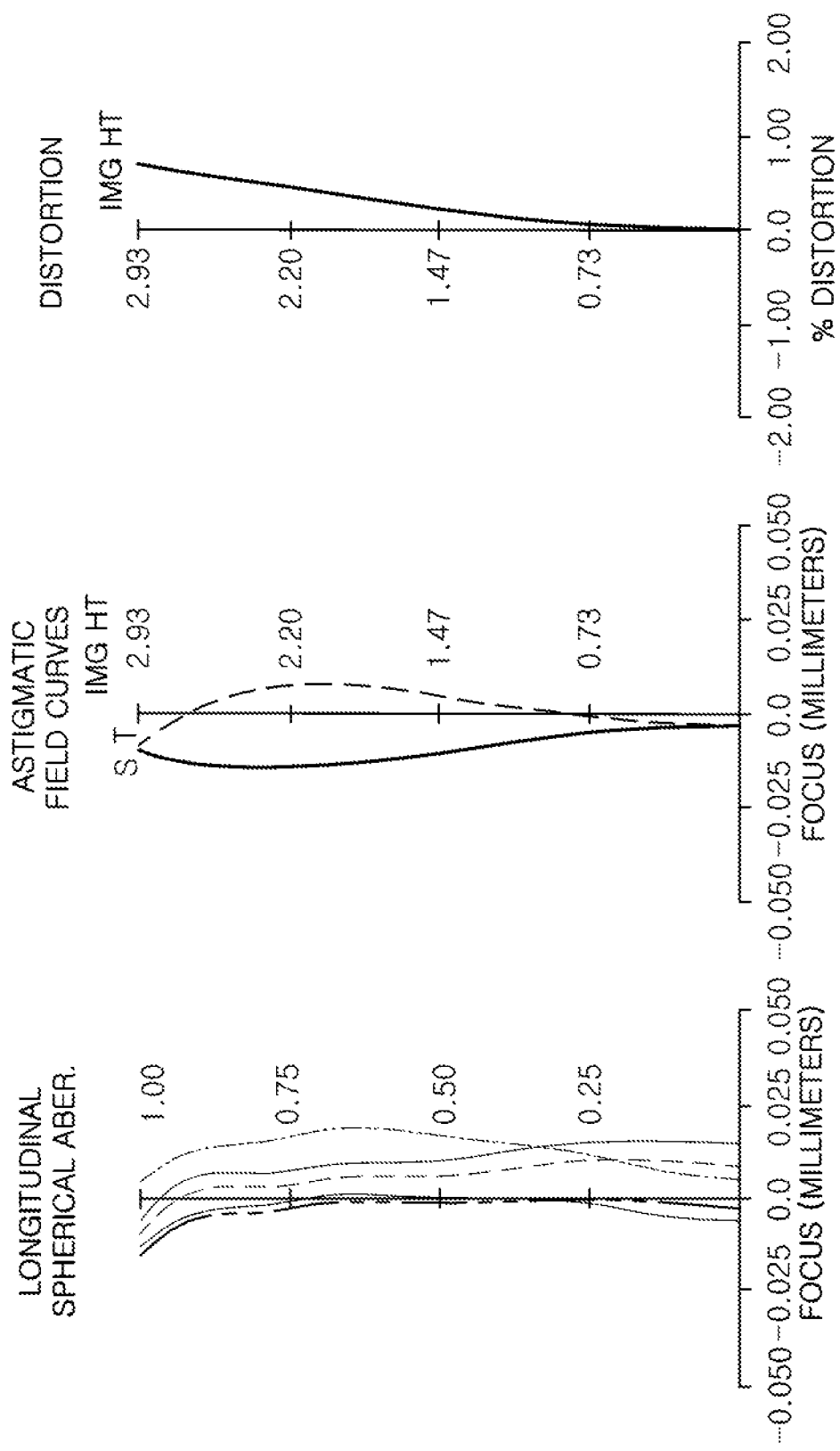
FIGS. 7 and 8 are graphs showing curves illustrating aberration characteristics of the optical imaging system illustrated in FIG. 6.
Figure 8:
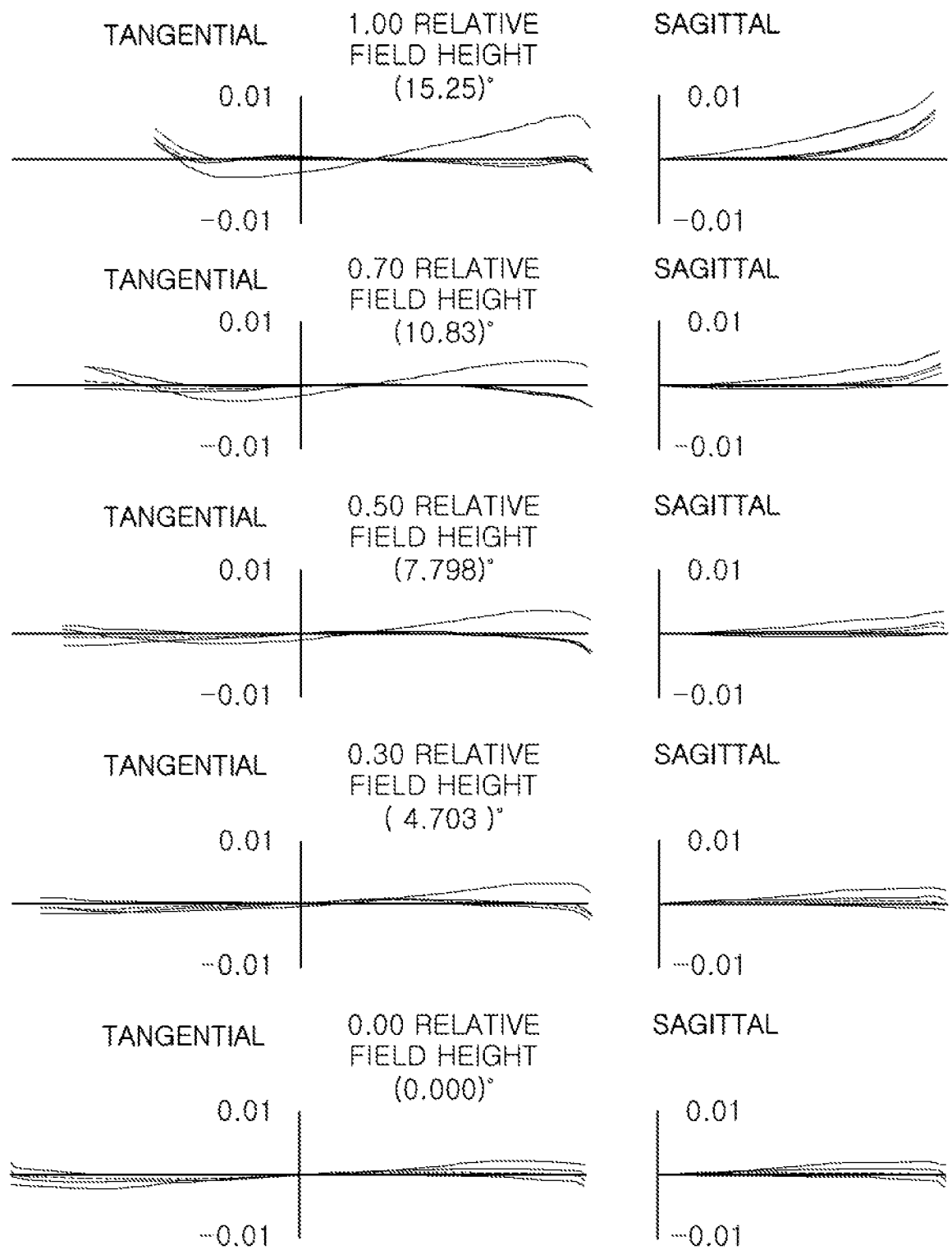

FIG. 6 is a view illustrating another example of an optical imaging system. FIGS. 7 and 8 are graphs showing curves illustrating aberration characteristics of the optical imaging system illustrated in FIG. 6. FIG. 9 is a table listing characteristics of lenses of the optical imaging system illustrated in FIG. 6. FIG. 10 is a table listing aspherical coefficients of lenses of the optical imaging system illustrated in FIG. 6.

Referring to FIG. 6, the optical imaging system includes an optical system including a first lens 210, a second lens 220, a third lens 230, a fourth lens 240, and a fifth lens 250. The optical imaging system further includes an infrared cut-off filter 260 and an image sensor 270.

In addition, the optical imaging system includes a reflection member P disposed closer to an object than the first lens 210, and having a reflection surface that changes a path of light.

Characteristics (radii of curvature, thicknesses or distances between lenses, refractive indices, and Abbe numbers) of the first to fifth lenses 210 to 250 are illustrated in FIG. 9.

An overall focal length (f) of the optical imaging system is 10.6829 mm, a focal length (f1) of the first lens 210 is 7.421434 mm, a focal length (f2) of the second lens 220 is −11.30066 mm, a focal length (f3) of the third 230 lens is −10.03253 mm, a focal length (f4) of the fourth lens 240 is 13.720675 mm, and a focal length (f5) of the fifth lens 250 is 20.495998 mm.

A field of view (FOV) of the optical imaging system is 30.5°, a distance (TTL) from an object-side surface of the first lens 210 to an imaging plane of the image sensor 270 is 11.5 mm, a distance (BFL) from the image-side surface of the fifth lens 250 closest to the image sensor 270 to the imaging plane of the image sensor 270 is 7.06 mm, a combined focal length (f12) of the first lens 210 and the second lens 220 is 13.83764 mm, and a maximum value (CRA_max) of an incident angle of a chief ray incident on the imaging plane is 19.891°. The distance TTL is equal to the sum of the thicknesses or distances for surfaces 1 to 12 in FIG. 9. However, although the values of thickness or distance in FIG. 9 are shown to 3 decimal places, the actual values have more decimal places, and thus the actual value of TTL=11.5 mm is slightly different from the sum TTL=11.501 mm obtained from the values of thickness or distance in FIG. 9 due to the unillustrated additional decimal places.

The first lens 210 has a positive refractive power, a first surface thereof is convex in the paraxial region, and a second surface thereof is concave in the paraxial region.

The second lens 220 has a negative refractive power, a first surface thereof is convex in the paraxial region, and a second surface thereof is concave in the paraxial region.

The third lens 230 has a negative refractive power, a first surface thereof is concave in the paraxial region, and a second surface thereof is convex in the paraxial region.

The fourth lens 240 has a positive refractive power, a first surface thereof is concave in the paraxial region, and a second surface thereof is convex in the paraxial region.

The fifth lens 250 has a positive refractive power, a first surface thereof is convex in the paraxial region, and a second surface thereof is concave in the paraxial region.

Surfaces of the first to fifth lenses 210 to 250 have aspherical coefficients as illustrated in FIG. 10. In this example, all object-side surfaces and all image-side surfaces of the first to fifth lenses 210 to 250 are aspherical.

The optical imaging system illustrated in FIG. 6 has the aberration characteristics illustrated in FIGS. 7 and 8.

Another example of an optical imaging system will now be described with reference to FIGS. 11 through 15.

Figure 11:
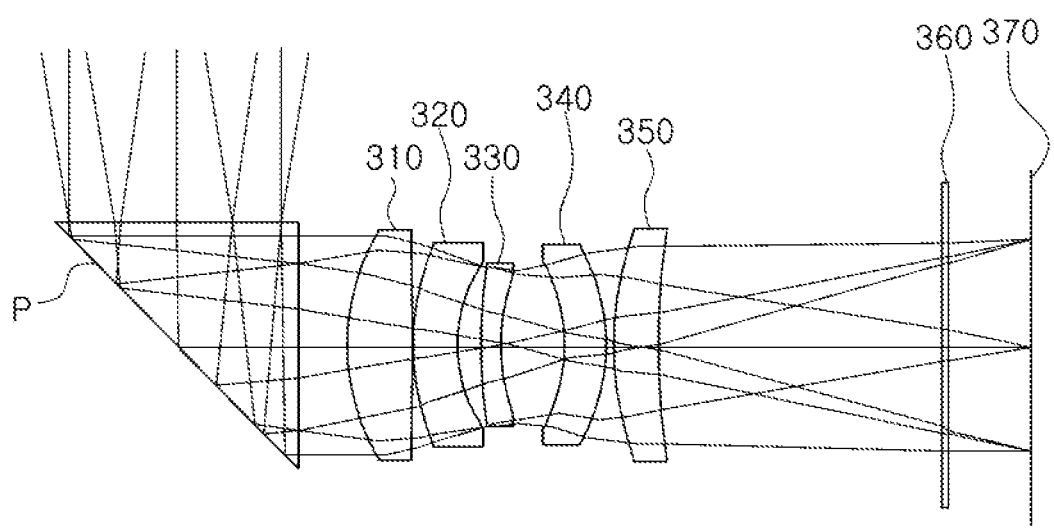
FIG. 11 is a view illustrating another example of an optical imaging system.
Figure 12:
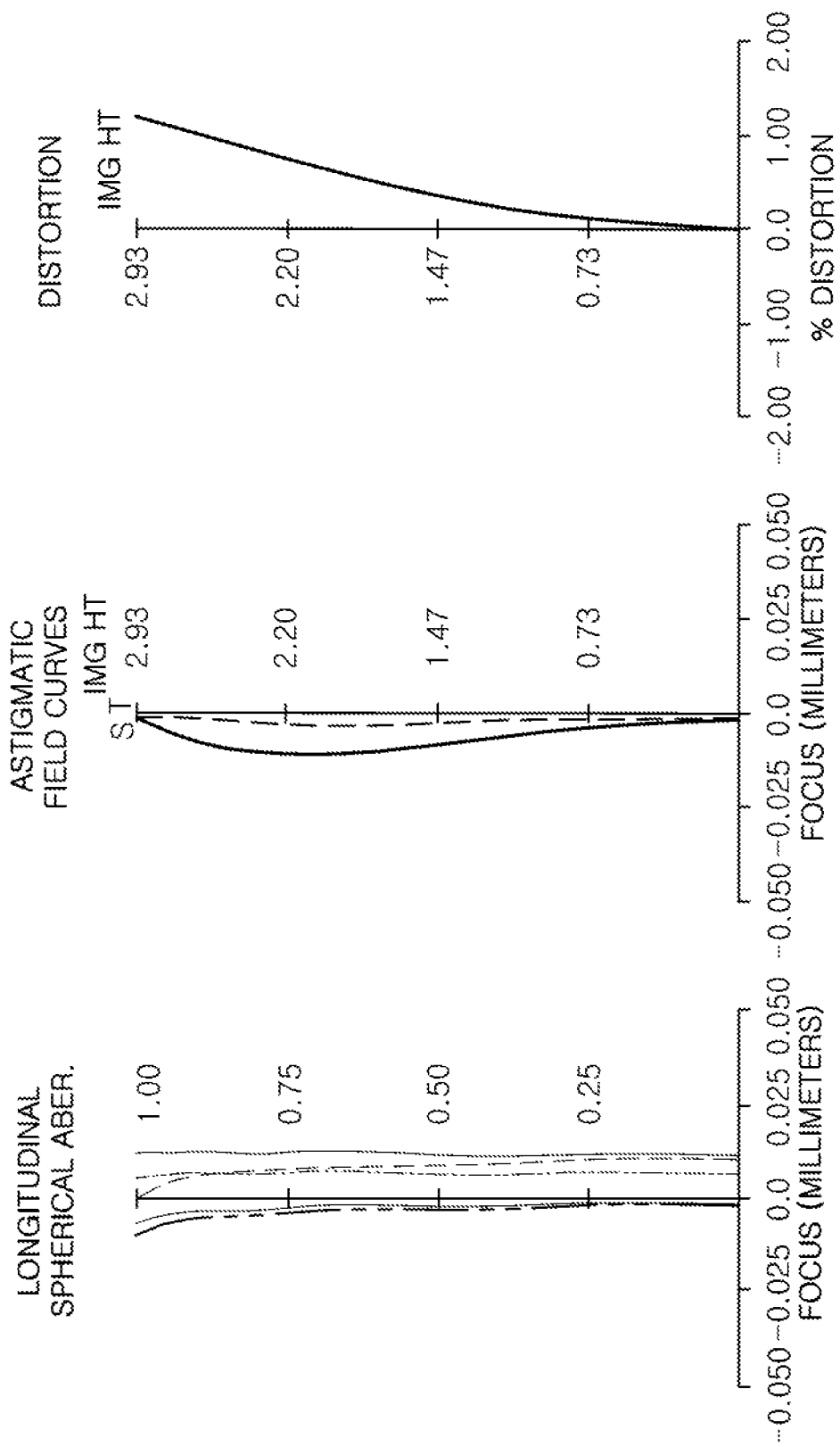
FIGS. 12 and 13 are graphs showing curves illustrating aberration characteristics of the optical imaging system illustrated in FIG. 11.
Figure 13:
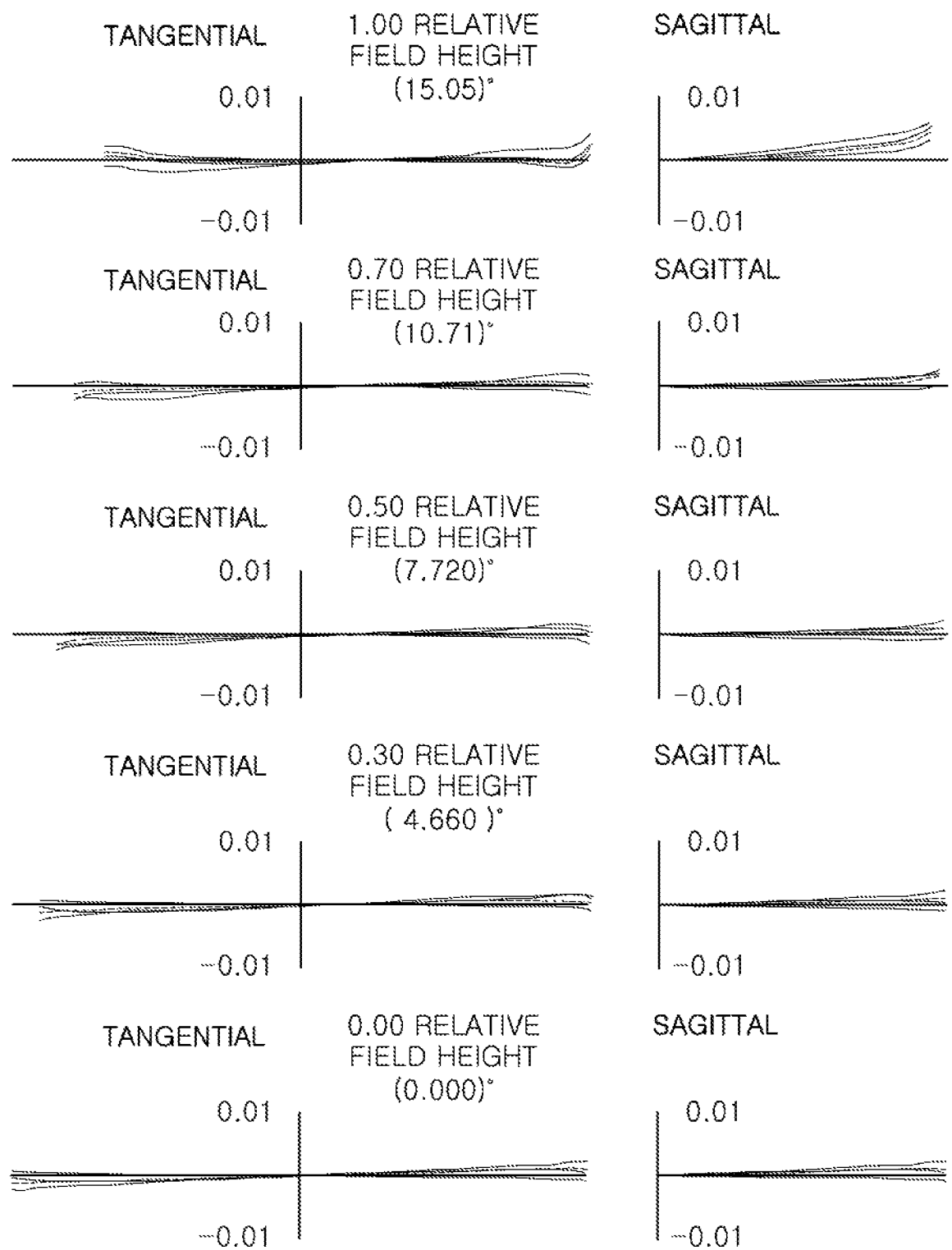

FIG. 11 is a view illustrating another example of an optical imaging system. FIGS. 12 and 13 are graphs showing curves illustrating aberration characteristics of the optical imaging system illustrated in FIG. 11. FIG. 14 is a table listing characteristics of lenses of the optical imaging system illustrated in FIG. 11. FIG. 15 is a table listing aspherical coefficients of lenses of the optical imaging system illustrated in FIG. 11.

Referring to FIG. 11, the optical imaging system includes an optical system including a first lens 310, a second lens 320, a third lens 330, a fourth lens 340, and a fifth lens 350. The optical imaging system further includes an infrared cut-off filter 360 and an image sensor 370.

In addition, the optical imaging system includes a reflection member P disposed closer to an object than the first lens 310, and having a reflection surface that changes a path of light.

Characteristics (radii of curvature, thicknesses or distances between lenses, refractive indices, and Abbe numbers) of the first to fifth lenses 310 to 350 are illustrated in FIG. 14.

An overall focal length (f) of the optical imaging system is 10.7805 mm, a focal length (f1) of the first lens 310 is 6.219282 mm, a focal length (f2) of the second lens 320 is −12.47561 mm, a focal length (f3) of the third lens 330 is −13.20208 mm, a focal length (f4) of the fourth lens 340 is −52.67893 mm, and a focal length (f5) of the fifth lens 350 is 13.285594 mm.

A field of view (FOV) of the optical imaging system is 30.1°, a distance (TTL) from an object-side surface of the first lens 310 to an imaging plane of the image sensor 370 is 11.48 mm, a distance (BFL) from the image-side surface of the fifth lens 350 closest to the image sensor 370 to the imaging plane of the image sensor 370 is 6.285 mm, a combined focal length (f12) of the first lens 310 and the second lens 320 is 9.13563 mm, and a maximum value (CRA_max) of an incident angle of a chief ray incident on the imaging plane is 18.361°.

The first lens 310 has a positive refractive power, and a first surface and a second surface thereof are convex in the paraxial region.

The second lens 320 has a negative refractive power, a first surface thereof is convex in the paraxial region, and a second surface thereof is concave in the paraxial region.

The third lens 330 has a negative refractive power, a first surface thereof is convex in the paraxial region, and a second surface thereof is concave in the paraxial region.

The fourth lens 340 has a negative refractive power, a first surface thereof is concave in the paraxial region, and a second surface thereof is convex in the paraxial region.

The fifth lens 350 has a positive refractive power, a first surface thereof is convex in the paraxial region, and a second surface thereof is concave in the paraxial region.

Surfaces of the first to fifth lenses 310 to 350 have aspherical coefficients as illustrated in FIG. 15. In this example, example, all object-side surfaces and all image-side surfaces of the first to fifth lenses 310 to 350 are aspherical.

The optical imaging system illustrated in FIG. 11 has the aberration characteristics illustrated in FIGS. 12 and 13.

Another example of an optical imaging system will now be described with reference to FIGS. 16 through 20.

Figure 16:
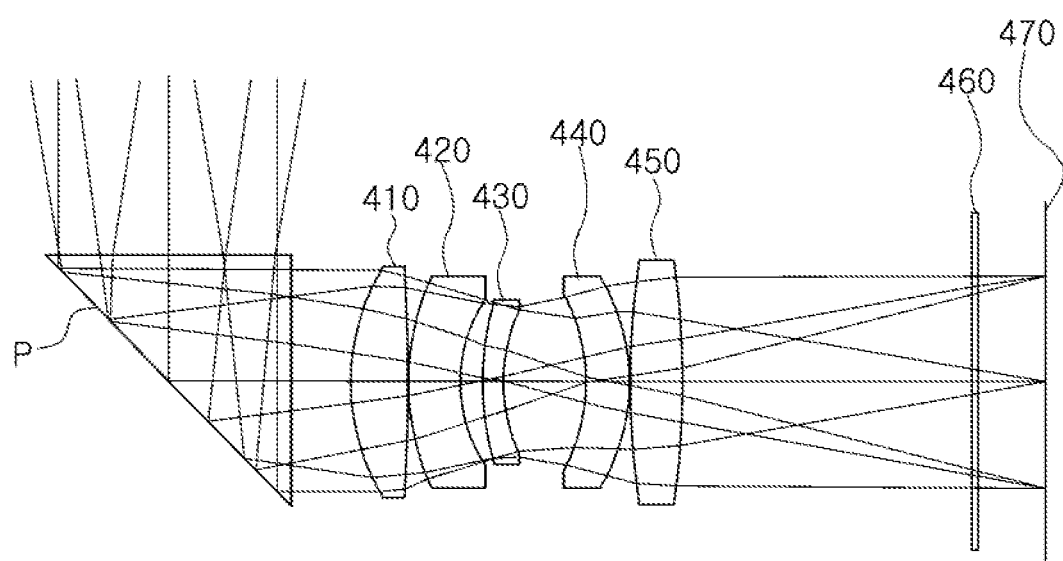
FIG. 16 is a view illustrating another example of an optical imaging system.
Figure 17:
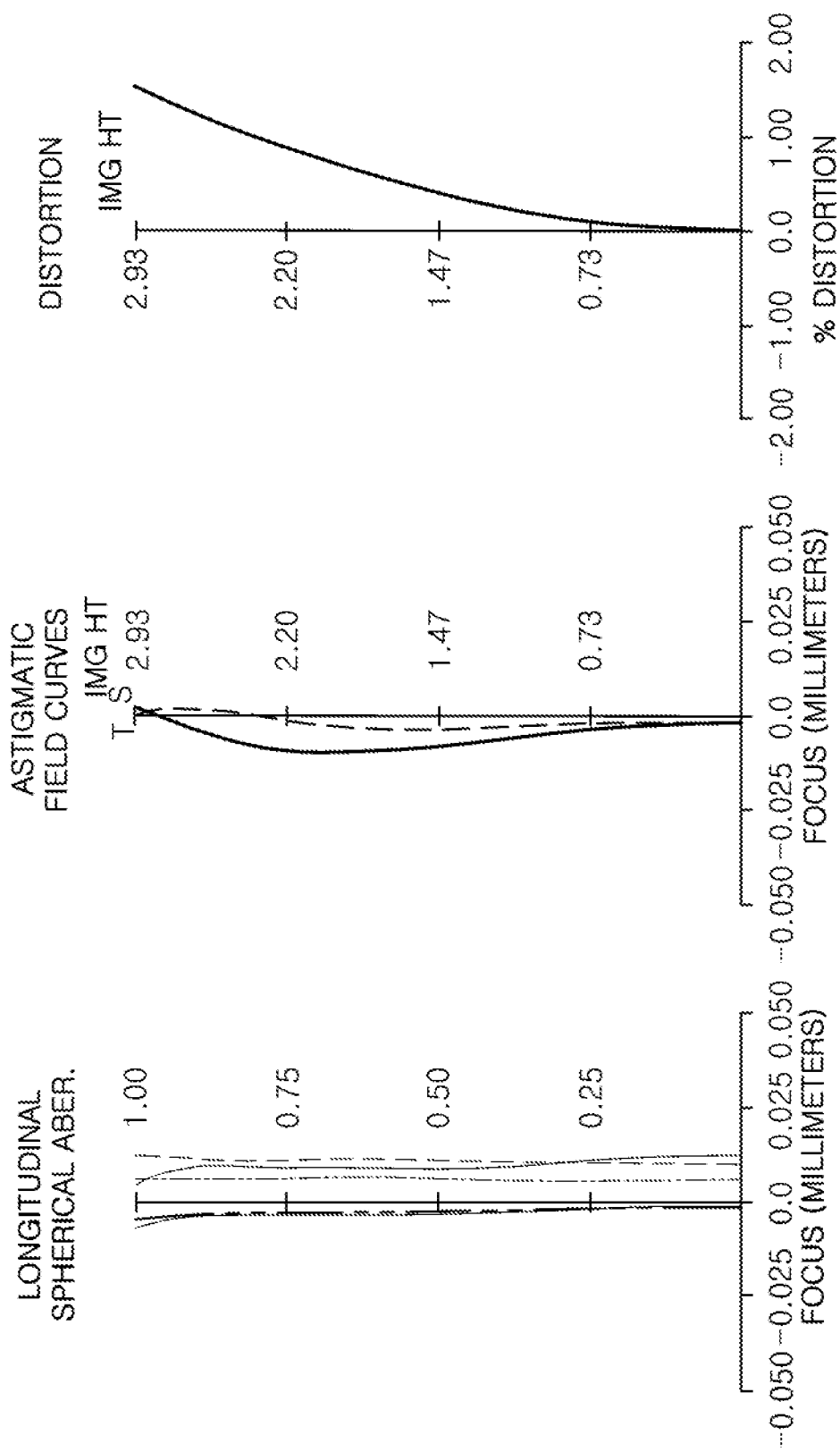
FIGS. 17 and 18 are graphs showing curves illustrating aberration characteristics of the optical imaging system illustrated in FIG. 16.
Figure 18:
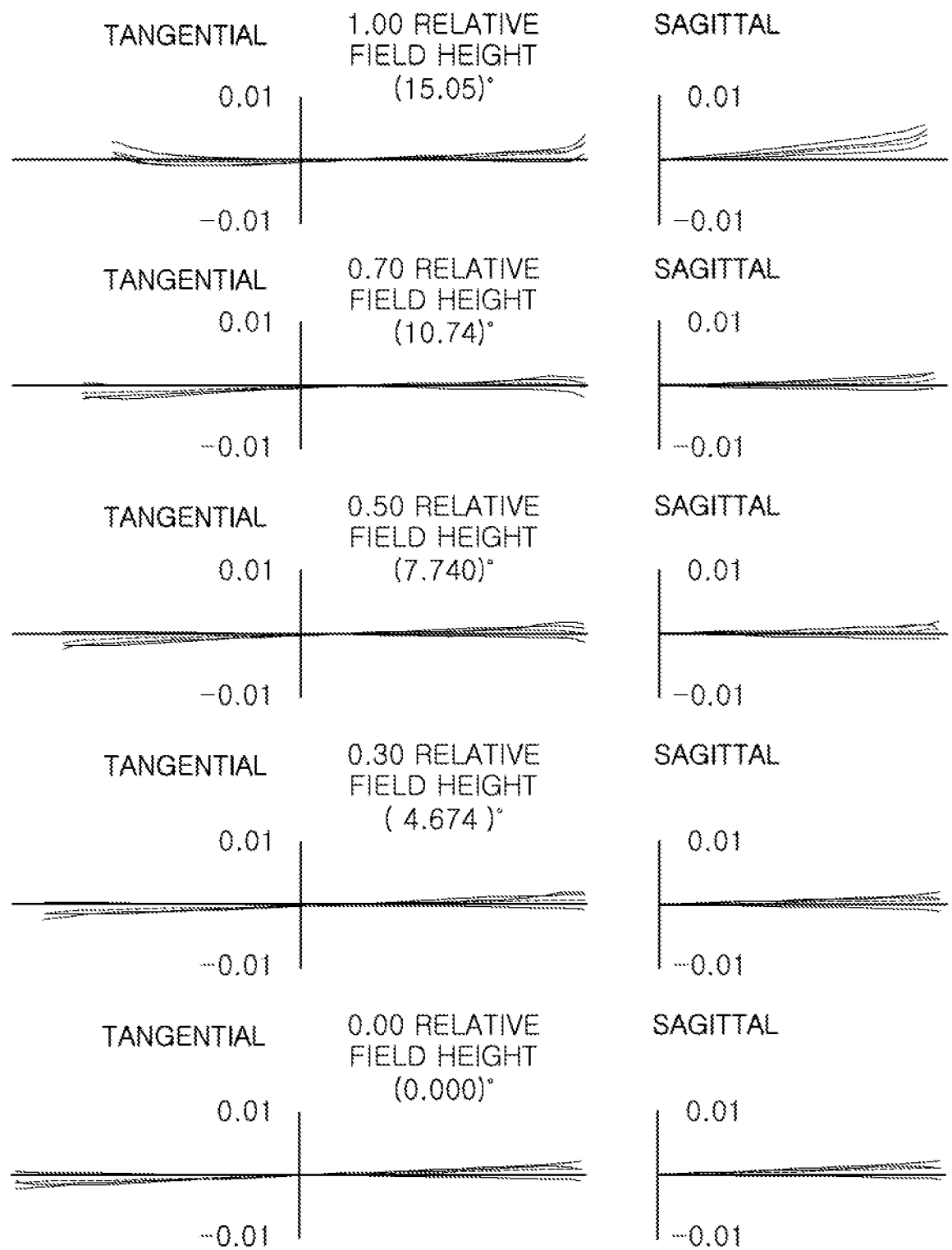

FIG. 16 is a view illustrating another example of an optical imaging system. FIGS. 17 and 18 are graphs showing curves illustrating aberration characteristics of the optical imaging system illustrated in FIG. 16. FIG. 19 is a table listing characteristics of lenses of the optical imaging system illustrated in FIG. 16. FIG. 20 is a table listing aspherical coefficients of lenses of the optical imaging system illustrated in FIG. 16.

Referring to FIG. 16, the optical imaging system includes an optical system including a first lens 410, a second lens 420, a third lens 430, a fourth lens 440, a fifth lens 450. The optical imaging system further includes an infrared cut-off filter 460 and an image sensor 470.

In addition, the optical imaging system includes a reflection member P disposed closer to an object than the first lens 410, and having a reflection surface that changes a path of light.

Characteristics (radii of curvature, thicknesses or distances between lenses, refractive indices, and Abbe numbers) of the first to fifth lenses 410 to 450 are illustrated in FIG. 19.

An overall focal length (f) of the optical imaging system is 10.7463 mm, a focal length (f1) of the first lens 410 is 5.673512 mm, a focal length (f2) of the second lens 420 is −11.71084 mm, a focal length (f3) of the third lens 430 is −9.98027 mm, a focal length (f4) of the fourth lens 440 is −50.40871 mm, and a focal length (f5) of the fifth lens 450 is 12.030906 mm.

A field of view (FOV) of the optical imaging system is 30.1°, a distance (TTL) from an object-side surface of the first lens 410 to an imaging plane of the image sensor 470 is 11.48 mm, a distance (BFL) from the image-side surface of the fifth lens 450 closest to the image sensor 470 to the imaging plane of the image sensor 470 is 6.013 mm, a combined focal length (f12) of the first lens 410 and the second lens 420 is 8.09794 mm, and a maximum value (CRA_max) of an incident angle of a chief ray incident on the imaging plane is 17.95°.

The first lens 410 has a positive refractive power, and a first surface and a second surface thereof are convex in the paraxial region.

The second lens 420 has a negative refractive power, a first surface thereof is convex in the paraxial region, and a second surface thereof is concave in the paraxial region.

The third lens 430 has a negative refractive power, a first surface thereof is convex in the paraxial region, and a second surface thereof is concave in the paraxial region.

The fourth lens 440 has a negative refractive power, a first surface thereof is concave in the paraxial region, and a second surface thereof is convex in the paraxial region.

The fifth lens 450 has a positive refractive power, and a first surface and a second surface thereof are convex in the paraxial region.

Surfaces of the first to fifth lenses 410 to 450 have aspherical coefficients as illustrated in FIG. 20. In this example, all object-side surfaces and all image-side surfaces of the first to fifth lenses 410 to 450 are aspherical.

The optical imaging system illustrated in FIG. 16 has the aberration characteristics illustrated in FIGS. 17 and 18.

Another example of an optical imaging system will now be described with reference to FIGS. 21 through 25.

Figure 21:
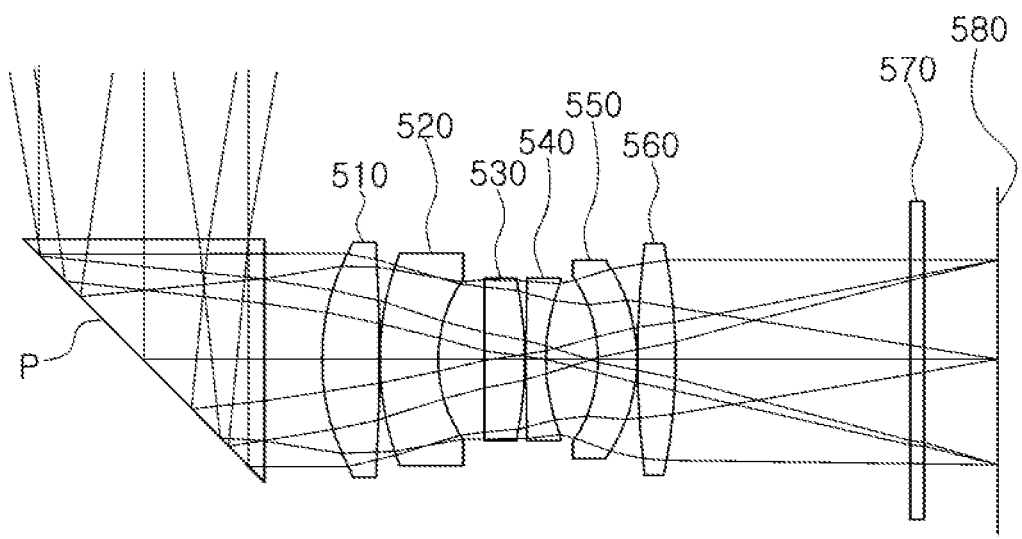
FIG. 21 is a view illustrating another example of an optical imaging system.
Figure 22:
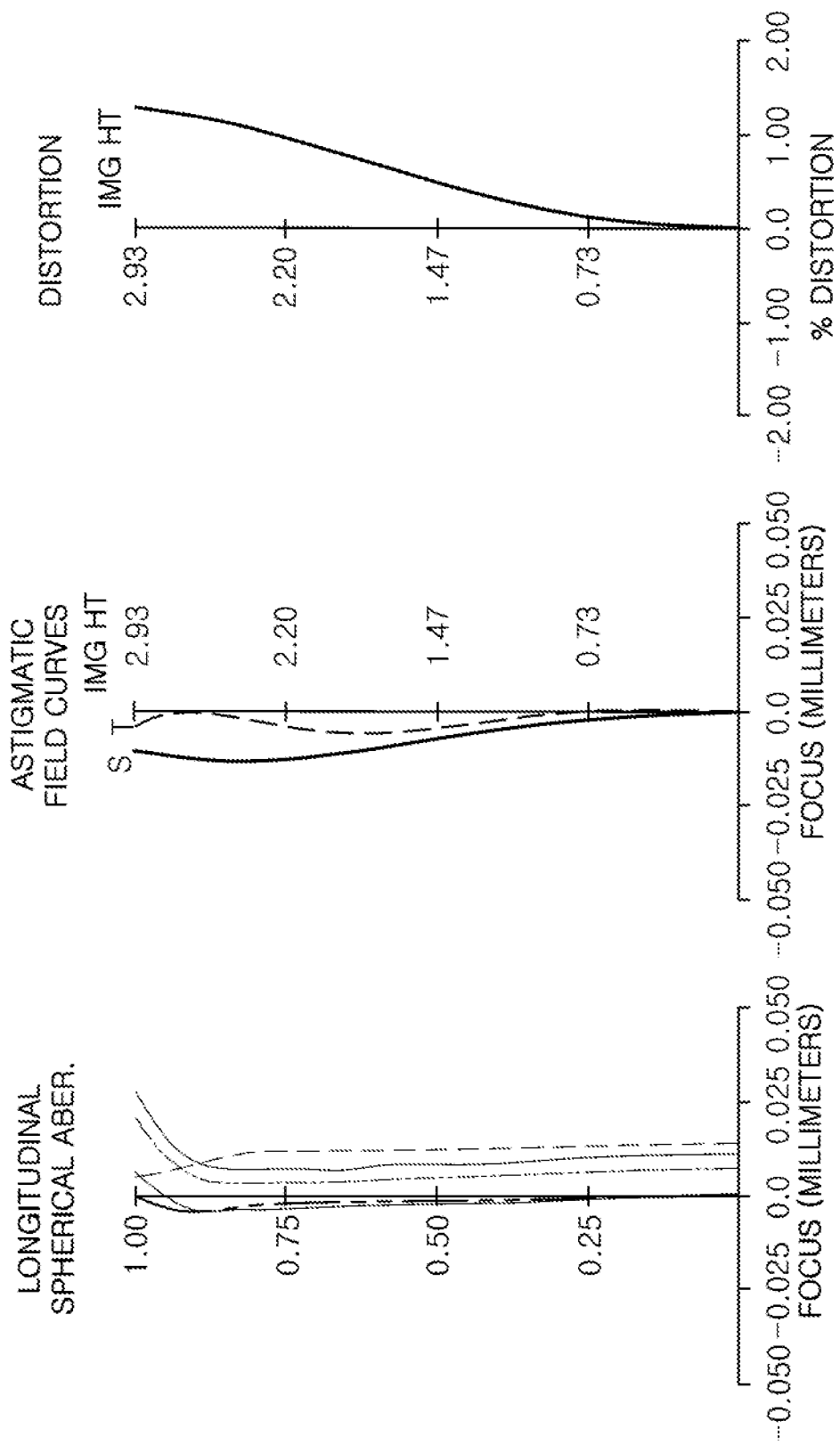
FIGS. 22 and 23 are graphs showing curves illustrating aberration characteristics of the optical imaging system illustrated in FIG. 21.
Figure 23:
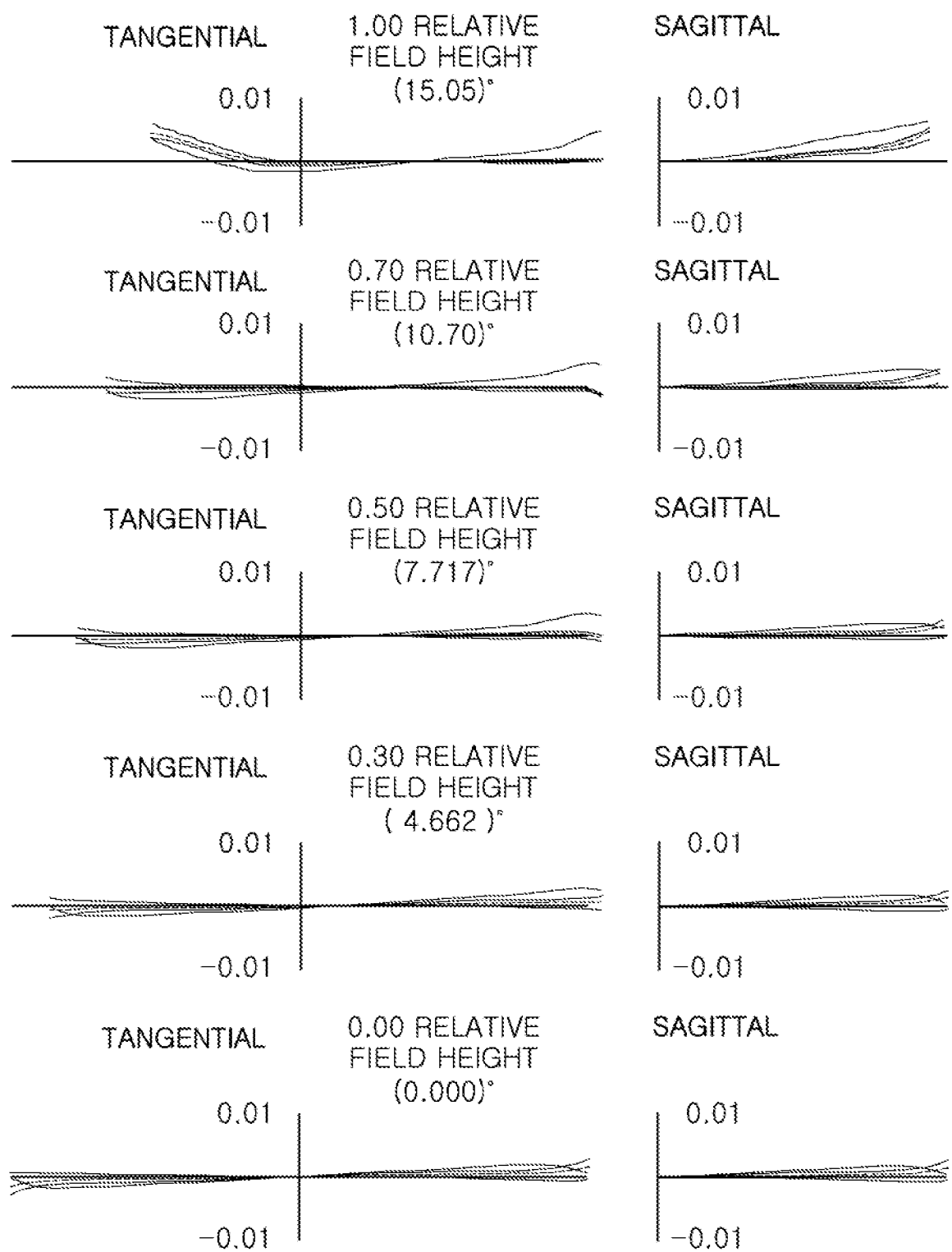

FIG. 21 is a view illustrating another example of an optical imaging system. FIGS. 22 and 23 are graphs showing curves illustrating aberration characteristics of the optical imaging system illustrated in FIG. 21. FIG. 24 is a table listing characteristics of lenses of the optical imaging system illustrated in FIG. 21. FIG. 25 is a table listing aspherical coefficients of lenses of the optical imaging system illustrated in FIG. 21.

Referring to FIG. 21, the optical imaging system includes an optical system including a first lens 510, a second lens 520, a third lens 530, a fourth lens 540, a fifth lens 550, a sixth lens 560. The optical imaging system further includes an infrared cut-off filter 570 and an image sensor 580.

In addition, the optical imaging system includes a reflection member P disposed closer to an object than the first lens 510, and having a reflection surface that changes a path of light.

Characteristics (radii of curvature, thicknesses or distances between lenses, refractive indices, and Abbe numbers) of the first to sixth lenses 510 to 560 are illustrated in FIG. 24.

An overall focal length (f) of the optical imaging system is 10.7709 mm, a focal length (f1) of the first lens 510 is 5.846304 mm, a focal length (f2) of the second lens 520 is −7.457007 mm, a focal length (f3) of the third lens 530 is 8.427394 mm, a focal length (f4) of the fourth lens 540 is −7.939981 mm, a focal length (f5) of the fifth lens 550 is −29.3957 mm, and a focal length (f6) of the sixth lens 560 is 15.16322 mm.

A field of view (FOV) of the optical imaging system is 30.1°, a distance (TTL) from an object-side surface of the first lens 510 to an imaging plane of the image sensor 580 is 11.48 mm, a distance (BFL) from the image-side surface of the sixth lens 560 closest to the image sensor 580 to the imaging plane of the image sensor 580 is 5.481 mm, a combined focal length (f12) of the first lens 510 and the second lens 520 is 12.16384 mm, and a maximum value (CRA_max) of an incident angle of a chief ray incident on the imaging plane is 20.19°.

The first lens 510 has a positive refractive power, and a first surface and a second surface thereof are convex in the paraxial region.

The second lens 520 has a negative refractive power, a first surface thereof is convex in the paraxial region, and a second surface thereof is concave in the paraxial region.

The third lens 530 has a positive refractive power, a first surface thereof is concave in the paraxial region, and a second surface thereof is convex in the paraxial region.

The fourth lens 540 has a negative refractive power, a first surface thereof is convex in the paraxial region, and a second surface thereof is concave in the paraxial region.

The fifth lens 550 has a negative refractive power, a first surface thereof is concave in the paraxial region, and a second surface thereof is convex in the paraxial region.

The sixth lens 560 has a positive refractive power, and a first surface and a second surface thereof are convex in the paraxial region.

Surfaces of the first to sixth lenses 510 to 560 have aspherical coefficients as illustrated in FIG. 25. In this example, all object-side surfaces and all image-side surfaces of the first to sixth lenses 510 to 560 are aspherical.

The optical imaging system illustrated in FIG. 21 has the aberration characteristics illustrated in FIGS. 22 and 23.

According to the examples described above, a slim optical imaging system having a narrow field of view may be implemented.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
    a plurality of lenses disposed along an optical axis, the plurality of lenses comprising a first lens having a positive refractive power, a second lens having a negative refractive power, a third lens having a negative refractive power, a fourth lens, and a fifth lens, the first, second, third, fourth, and fifth lenses being sequentially disposed in numerical order beginning with the first lens from an object side of an optical system comprising the first, second, third, fourth, and fifth lenses to an image side of the optical system; and
    a reflection member disposed closer to an object than the plurality of lenses, and comprising a reflection surface configured to change a path of light;
    wherein the plurality of lenses are spaced apart from each other along the optical axis; and
    the condition 0.9<DF/DC<1.3 is satisfied, where DF is an effective aperture radius of an image-side surface of a lens closest to an image sensor among the plurality of lenses, and DC is an effective aperture radius of an object-side surface of a lens closest to the reflection member among the plurality of lenses.

2. The optical imaging system of claim 1, wherein the condition FOV≤40 is satisfied, where FOV is a field of view of an optical system comprising the plurality of lenses.

3. The optical imaging system of claim 1, wherein the condition 1.3<TTL/BFL<3.5 is satisfied, where TTL is a distance from the object-side surface of the lens closest to the reflection member to an imaging plane of the image sensor, and BFL is a distance from the image-side surface of the lens closest to the image sensor to the imaging plane of the image sensor.

4. The optical imaging system of claim 1, wherein the condition 0.8<TTL/f<1.5 is satisfied, where TTL is a distance from the object-side surface of the lens closest to the reflection member to an imaging plane of the image sensor, and f is an overall focal length of an optical system comprising the plurality of lenses.

5. The optical imaging system of claim 1, wherein the plurality of lenses comprise a first lens, a second lens, a third lens, a fourth lens, and a fifth lens sequentially disposed in numerical order beginning with the first lens from an object side of an optical system comprising the plurality of lenses toward an image side of the optical system; and
    the condition 0.6<f12/f<2.0 is satisfied, where f12 is a combined focal length of the first lens and the second lens, and f is an overall focal length of an optical system comprising the first, second, third, fourth, and fifth lenses.

6. The optical imaging system of claim 1, wherein:
    the first lens has a convex object-side surface and a concave image-side surface,
    the third lens has a convex image-side surface,
    the fourth lens has a concave object-side surface, and
    the fifth lens has a convex object-side surface.

7. The optical imaging system of claim 1, wherein the plurality of lenses comprise:
    a first lens having a positive refractive power;
    a second lens having a negative refractive power;
    a third lens having a negative refractive power;
    a fourth lens having a positive refractive power; and
    a fifth lens having a positive refractive power; and
    the first, second, third, fourth, and fifth lenses are sequentially disposed in numerical order beginning with the first lens from an object side of an optical system comprising the first, second, third, fourth, and fifth lenses toward an image side of the optical system.

8. The optical imaging system of claim 1, wherein the plurality of lenses comprise:
    a first lens having a positive refractive power, an object-side surface and an image-side surface thereof being convex;
    a second lens having a negative refractive power, an object-side surface thereof being convex and an image-side surface thereof being concave;
    a third lens having a negative refractive power;
    a fourth lens having a negative refractive power; and
    a fifth lens; and the first, second, third, fourth, and fifth lenses are sequentially disposed in numerical order beginning with the first lens from an object side of an optical system comprising the first, second, third, fourth, and fifth lenses toward an image side of the optical system.

9. The optical imaging system of claim 8, wherein an object-side surface and an image-side surface of the fifth lens are convex.

10. The optical imaging system of claim 1, wherein the plurality of lenses comprise a first lens, a second lens, a third lens, a fourth lens, a fifth lens, and a sixth lens sequentially disposed in numerical order beginning with the first lens from an object side of an optical system comprising the first, second, third, fourth, fifth, and sixth lenses toward an image side of the optical system; and the condition $0.6<f12/f<2.0$ is satisfied, where f12 is a combined focal length of the first lens and the second lens, and f is an overall focal length of an optical system comprising the first, second, third, fourth, fifth, and sixth lenses.

11. The optical imaging system of claim 1, wherein the plurality of lenses comprise:
a first lens having a positive refractive power, an object-side surface and an image-side surface thereof being convex;
a second lens having a negative refractive power, an object-side surface thereof being convex;
a third lens, an object-side surface thereof being concave;
a fourth lens, an object-side surface thereof being convex;
a fifth lens; and
a sixth lens, an object-side surface and an image-side surface thereof being convex; and
the first, second, third, fourth, fifth, and sixth lenses are sequentially disposed in numerical order beginning with the first lens from an object side of an optical system comprising the first, second, third, fourth, fifth, and sixth lenses toward an image side of the optical system.

12. The optical imaging system of claim 1, wherein the plurality of lenses comprise:
a first lens having a positive refractive power, an object-side surface and an image-side surface thereof being convex;
a second lens having a negative refractive power, an object-side surface thereof being convex;
a third lens, an object-side surface thereof being concave;
a fourth lens;
a fifth lens, an object-side surface thereof being concave; and
a sixth lens, an object-side surface and an image-side surface thereof being convex; and
the first, second, third, fourth, fifth, and sixth lenses are sequentially disposed in numerical order beginning with the first lens from an object side of an optical system comprising the first, second, third, fourth, fifth, and sixth lenses toward an image side of the optical system.

13. The optical imaging system of claim 1, wherein the lens closest to the reflection member and the lens closest to the image sensor are plastic lenses made of a first plastic material; and
remaining lenses of the plurality of lenses are plastic lenses respectively made of other plastic materials having respective optical characteristics that are different from optical characteristics of the first plastic material, and different from one another, such that each one of the remaining lenses is made of a plastic material having optical characteristics that are different from the optical characteristics of the first plastic material, and different from the respective optical characteristics of the respective plastic materials of which all other ones of the remaining lenses are made.

14. An optical imaging system comprising:
a plurality of lenses disposed along an optical axis, the plurality of lenses comprising a first lens having a positive refractive power, a second lens having a negative refractive power, a third lens having a negative refractive power, a fourth lens, and a fifth lens, the first, second, third, fourth, and fifth lenses being sequentially disposed in numerical order beginning with the first lens from an object side of an optical system comprising the first, second, third, fourth, and fifth lenses to an image side of the optical system; and
a reflection member disposed closer to an object than the plurality of lenses, and comprising a reflection surface configured to change a path of light;
wherein the plurality of lenses are spaced apart from each other along the optical axis;
an object-side surface and an image-side surface of each of the plurality of lenses are aspherical; and
the condition $0.9<DF/DC<1.3$ is satisfied, where DF is an effective aperture radius of an image-side surface of a lens closest to an image sensor among the plurality of lenses, and DC is an effective aperture radius of an object-side surface of a lens closest to the reflection member among the plurality of lenses.

15. The optical imaging system of claim 14, wherein:
the first lens has a convex object-side surface and a concave image-side surface thereof being concave,
the third lens has a convex image-side surface,
the fourth lens has a concave object-side surface, and
the fifth lens has a convex object-side surface.

16. The optical imaging system of claim 14, wherein the plurality of lenses comprise:
a first lens having a positive refractive power, an object-side surface and an image-side surface thereof being convex;
a second lens having a negative refractive power, an object-side surface thereof being convex;
a third lens, an object-side surface thereof being concave;
a fourth lens, an object-side surface thereof being convex;
a fifth lens; and
a sixth lens, an object-side surface and an image-side surface thereof being convex; and
the first, second, third, fourth, fifth, and sixth lenses are sequentially disposed in numerical order beginning with the first lens from an object side of an optical system comprising the first, second, third, fourth, fifth, and sixth lenses toward an image side of the optical system.

17. An optical imaging system comprising:
a reflection surface configured to reflect light from an object; and
an optical system configured to receive the light from the object reflected by the reflection surface and focus an image of the object onto an imaging plane of an image sensor;
wherein the optical system comprises a plurality of lenses disposed along an optical axis, the plurality of lenses comprising a first lens closest to the reflection surface having a positive refractive power, a second lens having a negative refractive power, a third lens having a negative refractive power, a fourth lens having a positive refractive power or a negative refractive power, and a fifth lens closest to the imaging plane of the image sensor having a positive refractive power, wherein the first, second, third, fourth, and fifth lenses are sequentially disposed in numerical order from the first lens to the fifth lens; and the following conditions are satisfied:

$$1.3 < TTL/BFL < 3.5$$

$$0.8 < TTL/f < 1.5$$

where TTL is a distance from an object-side surface of a lens closest to the reflection surface among the plurality of lenses to the imaging plane of the image sensor, BFL is a distance from an image-side surface of a lens closest to the imaging plane of the image sensor among the plurality of lenses to the imaging plane of the image sensor, and f is an overall focal length of the optical system.

18. The optical imaging system of claim 17, wherein the following condition is satisfied:

$$0.9 < DF/DC < 1.3$$

where DF is an effective aperture radius of the image-side surface of the lens closest to the imaging plane of the image sensor, and DC is an effective aperture radius of the object-side surface of the lens closest to the reflection surface.

19. The optical imaging system of claim 17, wherein the lens closest to the reflection surface is a first lens of the optical system;

a lens closest to the first lens among the plurality of lenses is a second lens of the optical system; and the following condition is satisfied:

$$0.6 < f12/f < 2.0$$

where f12 is a combined focal length of the first lens and the second lens.

20. The optical imaging system of claim 17, wherein the plurality of lenses comprise:

a first lens having a positive refractive power, the first lens being the lens closest to the reflection surface;

a second lens having a negative refractive power;

a third lens having a positive refractive power;

a fourth lens having a negative refractive power;

a fifth lens having a negative refractive power; and a sixth lens having a positive refractive power, the sixth lens being the lens closest to the imaging plane of the image sensor; and the first, second, third, fourth, fifth, and sixth lenses are sequentially disposed in numerical order from the first lens to the sixth lens.

* * * * *